US012544366B2

(12) United States Patent
Glasberg et al.

(10) Patent No.: US 12,544,366 B2
(45) Date of Patent: Feb. 10, 2026

(54) COMBINATION OF ENDOCANNABINOID AND mTOR INHIBITORS IN THE TREATMENT OF NEUROENDOCRINE NEOPLASMS

(71) Applicant: HADASIT MEDICAL RESEARCH SERVICES AND DEVELOPMENT LTD., Jerusalem (IL)

(72) Inventors: Simona Glasberg, Jerusalem (IL); David Polak, Jerusalem (IL); Shani Avniel Polak, Jerusalem (IL)

(73) Assignee: HADASIT MEDICAL RESEARCH SERVICES AND DEVELOPMENT LTD., Jerusalem (IL)

( * ) Notice: Subject to any disclaimer, the term of this patent is extended or adjusted under 35 U.S.C. 154(b) by 0 days.

(21) Appl. No.: 18/865,805

(22) PCT Filed: May 17, 2023

(86) PCT No.: PCT/IL2023/050506
§ 371 (c)(1),
(2) Date: Nov. 14, 2024

(87) PCT Pub. No.: WO2023/223323
PCT Pub. Date: Nov. 23, 2023

(65) Prior Publication Data
US 2025/0288565 A1    Sep. 18, 2025

Related U.S. Application Data

(60) Provisional application No. 63/343,129, filed on May 18, 2022.

(51) Int. Cl.
A61K 31/439    (2006.01)
A61K 31/454    (2006.01)
A61P 35/00    (2006.01)

(52) U.S. Cl.
CPC .......... *A61K 31/439* (2013.01); *A61K 31/454* (2013.01); *A61P 35/00* (2018.01)

(58) Field of Classification Search
None
See application file for complete search history.

(56) References Cited

U.S. PATENT DOCUMENTS

| 7,378,418 B2 * | 5/2008 | Yu et al. |
| 8,410,131 B2 | 4/2013 | Lane et al. |
| 9,006,224 B2 | 4/2015 | Marks et al. |
| 2021/0267950 A1 | 9/2021 | Guy et al. |

OTHER PUBLICATIONS

Morell et al. (Prostate Cancer and Prostatic Diseases (2016; 19: 248-257) (Year: 2016).*
Sarnataro et al. (Molecular Pharmacology (2006); 70 (4); 1733-1739) (Year: 2006).*

(Continued)

Primary Examiner — Brandon J Fetterolf
(74) Attorney, Agent, or Firm — The Roy Gross Law Firm, LLC; Roy D. Gross

(57) ABSTRACT

Disclosed are methods of treatment, compositions and kits comprising endocannabinoid receptor (ECR) antagonist and an mTOR inhibitor for treating neoplasm in a subject in need thereof, and reducing drug resistance to standard treatment.

15 Claims, 21 Drawing Sheets

(56) References Cited

OTHER PUBLICATIONS

Hua et al. (Journal of Hematology & Oncology (2019); 12 (1); 1-19) (Year: 2019).*

Avniel-Polak, Shani et al. "Engaging the Endocannabinoid System in Neuroendocrine Neoplasms (NENs) potentiates treatment outcomes and null drug resistance." Endocrine Abstracts. vol. 81. Bioscientifica, 2022. DOI: 10.1530/endoabs.81.OC14.6.

Fogli, Stefano et al. "Cannabinoid derivatives induce cell death in pancreatic MIA PaCa-2 cells via a receptor-independent mechanism." FEBS letters, Mar. 20, 2006; 580(7): 1733-1739. doi: 10.1016/j.febslet.2006.02.024. Epub Feb. 20, 2006. PMID: 16500647.

Sarnataro, Daniela et al. "The cannabinoid CB1 receptor antagonist rimonabant (SR141716) inhibits human breast cancer cell proliferation through a lipid raft-mediated mechanism." Molecular pharmacology 70.4 (2006): 1298-1306. 10.1124/mol.106.025601. Epub Jul. 5, 2006. PMID: 16822929.

Hua, Hui et al. "Targeting mTOR for cancer therapy." Journal of hematology & oncology 12 (2019): 1-19. doi: 10.1186/s13045-019-0754-1. PMID: 31277692; PMCID: PMC6612215.

Sam, Amir H., Victoria Salem, and Mohammad A. Ghatei. "Rimonabant: from RIO to ban." Journal of obesity 2011.1 (2011): 432607. doi: 10.1155/2011/432607. Epub Jul. 6, 2011. PMID: 21773005; PMCID: PMC3136184.

PCT International Search Report for International Application No. PCT/IL2023/050506, mailed Aug. 17, 2023, 4pp.

PCT Written Opinion for for International Application No. PCT/IL2023/050506, mailed Aug. 17, 2023, 9pp.

Pekkala, Satu, et al. "Cannabinoid receptor 1 and acute resistance exercise—In vivo and in vitro studies in human skeletal muscle." Peptides 67 (2015): 55-63. doi: 10.1016/j.peptides.2015.03.007. Epub Mar. 18, 2015. PMID: 25796352.

* cited by examiner

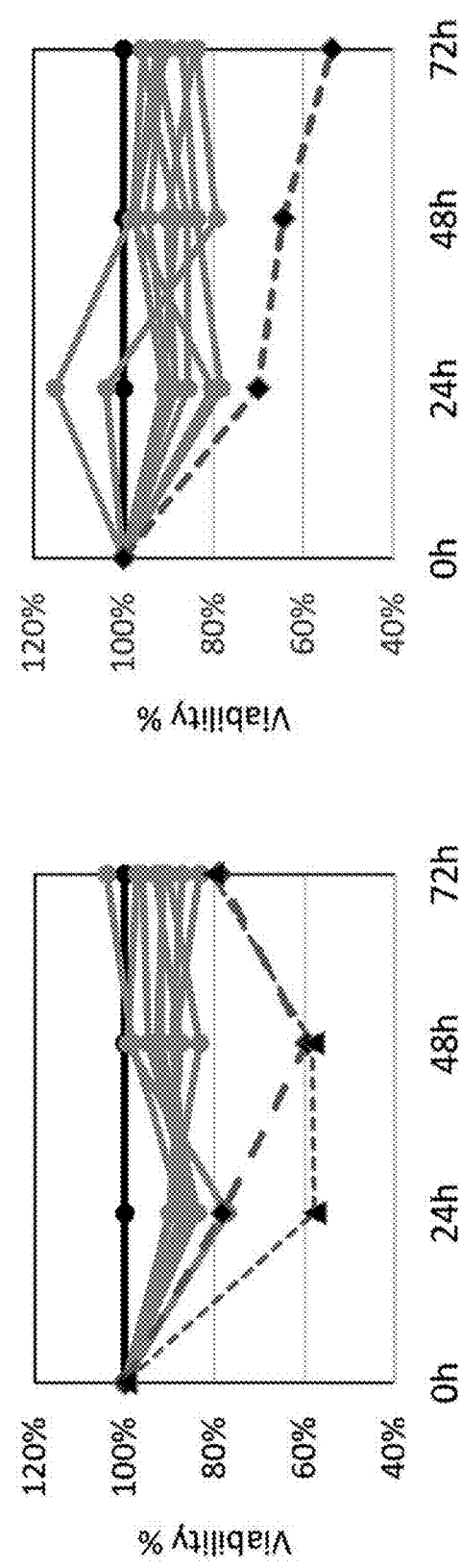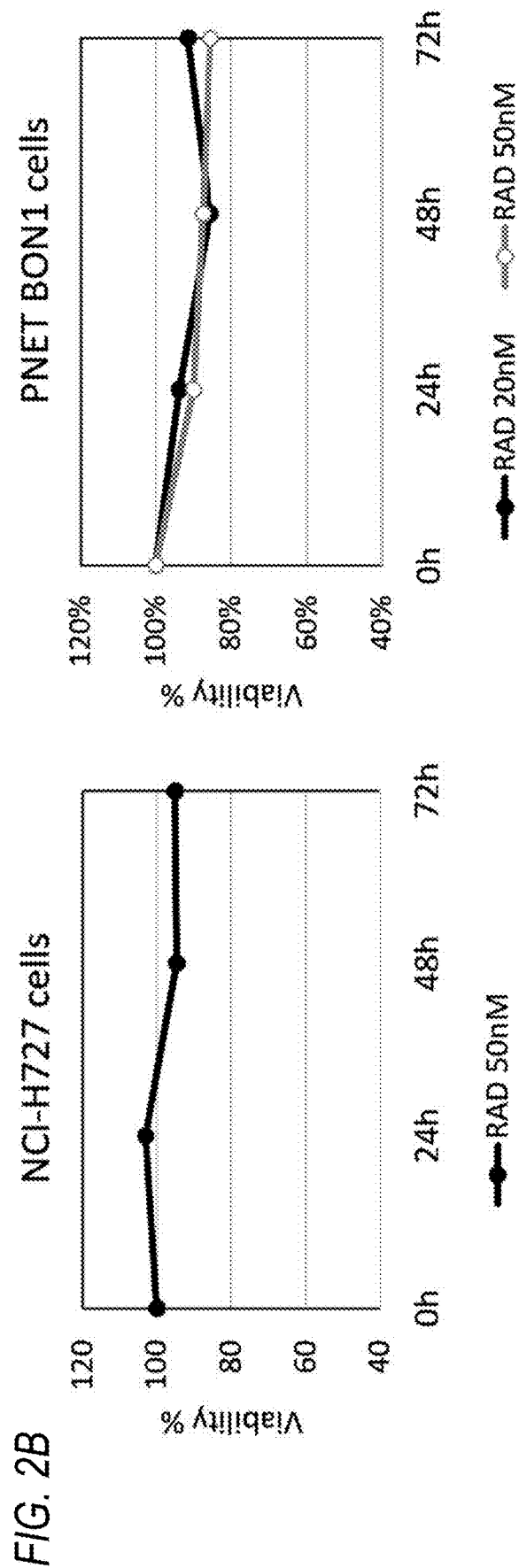
FIG. 2A
FIG. 2B

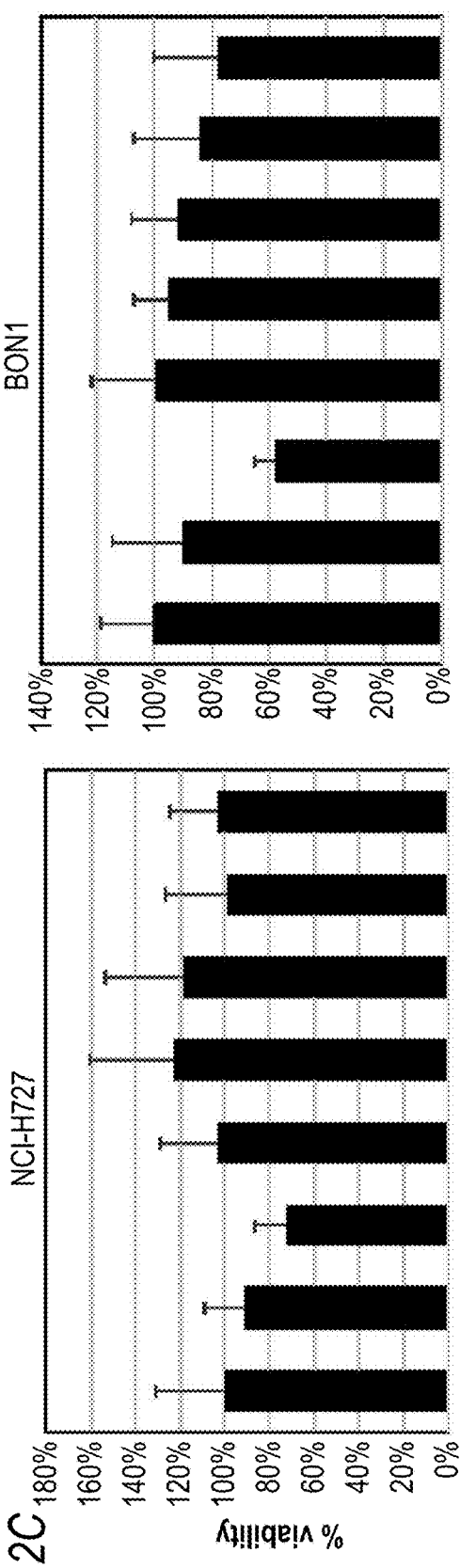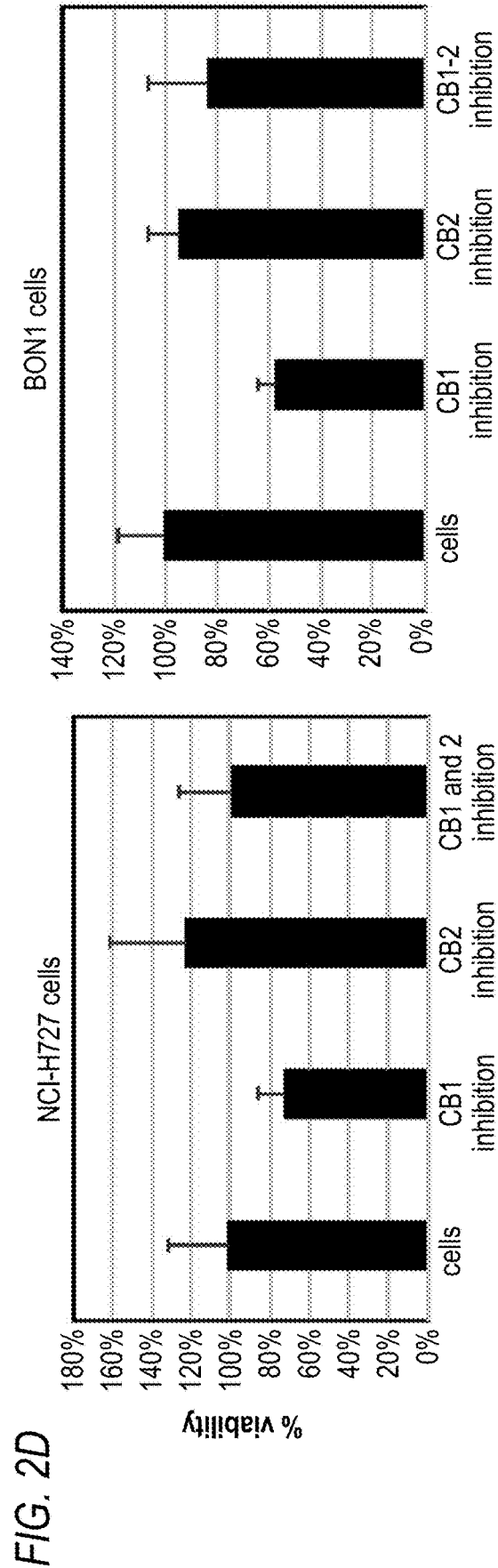
FIG. 2C
FIG. 2D

RAD001          RAD001+ AM251

*IVIS high resolution measurement*

COMBINATION OF ENDOCANNABINOID AND mTOR INHIBITORS IN THE TREATMENT OF NEUROENDOCRINE NEOPLASMS

CROSS REFERENCE TO RELATED APPLICATIONS

This application is a National Phase of PCT Patent Application No. PCT/IL2023/050506 having International filing date of May 17, 2023, which claims the benefit of priority of U.S. Provisional Patent Application No. 63/343,129, filed May 18, 2022, the contents of which are all incorporated herein by reference in their entirety.

TECHNOLOGICAL FIELD

Provided herein are compositions and methods for attenuating/treating neoplasms in particular neuroendocrine neoplasms (NENs), and more particularly unresectable metastatic NENs utilizing endocannabinoid receptor antagonists.

BACKGROUND

Neuroendocrine neoplasms (NENs) diagnosis and treatment are complex because of their relative rarity (e.g., an incidence of 6.9/100000/year) and heterogeneous biological behavior. Cure by surgery is limited to a small group of patients (less than 30%), while unresectable metastatic NENs (~70%) are typically treated with systemic therapies including either somatostatin analogs (SSAs), peptide receptor radioligand therapy (PRRT), targeted agents, or, rarely, chemotherapy. However, such treatments have limited efficacy and usually fail due to the development of drug resistance, followed by tumor progression and the related dreadful consequences for the patient.

While biological agents, such as the mTOR inhibitor everolimus (Eve), have a tumoristatic effect in the short term, in the long term the tumor eventually progresses via acquired resistance. Drug resistance is multifactorial and involves multiple pathways, such as the PI3K/Akt/mTOR feedback loop, activation of RAF/MEK/ERK signaling, stimulation of pro-autophagy signals, and more.

There thus remains a major need for new therapeutic venues and way of thinking for the treatment approach of NENs, in particular unresectable metastatic NENs.

Cannabinoids are lipophilic ligands found in *Cannabis sativa* plant and activating the endocannabinoid system, mostly used for their palliation properties.

Despite ongoing research to unravel the cannabis role in cancer, its biological functions and therapeutic properties are poorly understood, especially in NENs.

SUMMARY OF THE INVENTION

There is provided herein composition(s) comprising an endocannabinoid receptor (ECR) antagonist for treatment of neoplasms as well as methods comprising administering same to a subject in need thereof.

Advantageously, it was demonstrated by the inventors of the present invention that utilizing the herein disclosed composition(s) comprising a cannabinoid receptor type 1 (CB1) inhibitor reduces NENs cell viability and proliferation, and promotes a shift towards cell cycle arrest. Moreover, it was advantageously found that a combination of mTOR inhibitor, such as everolimus (Eve), with ECR antagonist, such as CB1-blocking agents, augmented neuroendocrine neoplasms (NENs) apoptotic cell death and prevented/reduced drug resistance to mTOR inhibitor alone. In addition, it was demonstrated in a NENs mouse model that combining mTOR inhibitor with CB1-blocking agents provides at least an additive inhibitory effect on tumor growth with sustained decrease in tumor size/biomass as compared to each drug alone.

Together, the results suggest that ECR inhibition alone or in combination with standard NENs treatment may lead to a novel and efficient modality to treat NENs, and diminishes the development of resistance.

According to some aspects, there is provided a method for treating neoplasm comprising administering to a subject in need thereof an endocannabinoid receptor (ECR) antagonist and an mTOR inhibitor.

In some embodiments, the mTOR inhibitor is selected from rapamycin, deforolimus, temsirolimus, everolimus, ridaforolimus, Torin1, BEZ-235, or any combination thereof. Each possibility is a separate embodiment.

In some embodiments, the ECR antagonist is a CB1 antagonist; in some embodiments, the CB1 antagonist is selected from AM251, rimonabant, TM38837, JD-5034, SR147778, NESS 0327, LY-320135, AM281, Cannabigerol, Ibipinabant, Otenabant, Tetrahydrocannabivarin, Virodhamine, or any combination thereof. Each possibility is a separate embodiment.

In some embodiments the CB1 antagonist comprises rimonabant, TM38837 and JD-5034,or any combination thereof. Each possibility is a separate embodiment.

In some embodiments, the neoplasm is a Neuroendocrine Neoplasm (NEN); in some embodiments, the NEN is an unresectable NEN; in some embodiments, the unresectable NEN is an unresectable metastatic NEN; in some embodiments, the NEN is developed anywhere in the body; in some embodiments, the NEN is a pancreatic NENs or a lung NEN; in some embodiments, the NEN is a pancreatic NENs; in some embodiments, the NEN is a lung NEN.

In some embodiments, the ECR antagonist and the mTOR inhibitor are administered concomitantly and/or sequentially.

In some embodiments, the neoplasm is a resistant neoplasm; in some other embodiments, the resistant neoplasm is resistant to mTOR inhibition alone; in some embodiments, the neoplasm is a resistant neoplasm, and wherein the resistant neoplasm is resistant to mTOR inhibition alone.

In some embodiments, the administration of ECR antagonist and mTOR inhibitor reduces or prevents drug resistance to the mTOR inhibitor.

In some embodiments, the neoplasm differentially expresses one or more genes of the group consisting of: FABP1, EIF3C, MT-ATP8, MUC2, PGGHG, SIK1B, EGR3, and MIR483.

In some embodiments, the neoplasm differentially expresses one or more genes of the group consisting of: FABP1, EIF3C, MT-ATP8, MUC2, PGGHG, SIK1B, EGR3, and MIR483, and wherein a change in the differential expression is at least (−/+) 0.5-fold change relative to control or to the expression before the administration of ECR antagonist and the mTOR inhibitor. Each possibility is a separate embodiment.

In some embodiments, the neoplasm differentially expresses one or more genes of the group consisting of: FABP1, EIF3C, MT-ATP8, and MUC2, and one or more genes of the group consisting of: PGGHG, SIK1B, EGR3, and MIR483, and wherein the two groups comprise opposite patterns of expression of the one or more differentially expressed genes;

In some embodiments, the opposite patterns of expression of the one or more differentially expressed genes comprises downregulation of one or more genes of the group consisting of: FABP1, EIF3C, MT-ATP8, and MUC2, and upregulation of one or more genes of the group consisting of: PGGHG, SIK1B, EGR3, and MIR483;

In some embodiments, the neoplasm differentially expresses one or more genes of the group consisting of: FABP1, EIF3C, MT-ATP8, and MUC2, and one or more genes of the group consisting of: PGGHG, SIK1B, EGR3, and MIR483, and wherein the two groups comprise opposite patterns of expression of the one or more differentially expressed genes, and wherein differential expression of the one or more genes comprises a change of at least (−/+) 0.5-fold relative to control or to the expression before the administration of ECR antagonist and the mTOR inhibitor.

In some embodiment, differential expression of the one or more genes comprises a change of at least at least (−/+) 1.1-fold, (−/+) 1.25-fold, (−/+) 1.5-fold, (−/+) 1.75-fold, (−/+) 2.0-fold, (−/+) 2.5-fold, (−/+) 3-fold, (−/+) 3.5-fold, (−/+) 4-fold, (−/+) 5-fold, or more, relative to control or to the expression before the administration of ECR antagonist and the mTOR inhibitor. Each possibility is a separate embodiment.

In some embodiment, differential expression of the one or more genes comprises a change of at least 0.1-fold, 0.25-fold, 0.5-fold, 0.75-fold, 1.25-fold, 1.5-fold, 1.75-fold, 2-fold, 3-fold, 4-fold, or more, relative to control or to the expression before the administration of ECR antagonist and the mTOR inhibitor. Each possibility is a separate embodiment.

In some embodiment, differential expression of the one or more genes comprises a change of at least (−/+) 0.1-fold, (−/+) 0.25-fold, (−/+) 0.5-fold, (−/+) 0.75-fold, (−/+) 1.25-fold, (−/+) 1.5-fold, (−/+) 1.75-fold, (−/+) 2-fold, (−/+) 3-fold, (−/+) 4-fold, or more, relative to control or to the expression before the administration of ECR antagonist and the mTOR inhibitor. Each possibility is a separate embodiment.

In some embodiment, the treatment promotes one or more of: reduction in neoplasm tumor biomass, reduction in neoplasm cell proliferation, transitioning of neoplasm cells to a state of cell cycle arrest, reduction in neoplasm cell viability, increase in neoplasm cell apoptosis, and/or reduction in neoplasm cell necrosis. Each possibility is a separate embodiment.

In some embodiment, the treatment promotes reduction in neoplasm tumor biomass; in some embodiment, the treatment promotes reduction in neoplasm cell proliferation; in some embodiment, the treatment promotes transitioning of neoplasm cells to a state of cell cycle arrest; in some embodiment, the treatment promotes reduction in neoplasm cell viability; in some embodiment, the treatment promotes increase in neoplasm cell apoptosis; in some embodiment, the treatment promotes reduction in neoplasm cell necrosis; or any combination thereof. Each possibility is a separate embodiment.

In some embodiment, reduction in neoplasm tumor biomass comprises reduction in one or more of: tumor volume, tumor weight, tumor area and tumor radiance;

In some embodiments, reduction in one or more of: tumor volume, tumor weight, tumor area and tumor radiance is at least additive in response to the treatment with ECR antagonist and mTOR inhibitor with respect to treatment with each agent alone; in some embodiments, reduction in one or more of: tumor volume, tumor weight, tumor area and tumor radiance is additive in response to the treatment with ECR antagonist and mTOR inhibitor with respect to treatment with each agent alone; in some embodiments, reduction in one or more of: tumor volume, tumor weight, tumor area and tumor radiance is synergistic in response to the treatment with ECR antagonist and mTOR inhibitor with respect to treatment with each agent alone.

In some embodiment, reduction in neoplasm tumor biomass comprises reduction in tumor volume and/or tumor weight; in some embodiment, reduction in tumor volume and/or tumor weight is at least additive in response to the treatment with ECR antagonist and mTOR inhibitor with respect to treatment with each agent alone; in some embodiment, reduction in tumor volume and/or tumor weight is additive in response to the treatment with ECR antagonist and mTOR inhibitor with respect to treatment with each agent alone; in some embodiment, reduction in tumor volume and/or tumor weight is synergistic in response to the treatment with ECR antagonist and mTOR inhibitor with respect to treatment with each agent alone;

According to some aspects, there is provided a composition for use in the treatment of a neoplasm, the composition comprising a therapeutically effective amount of an ECR antagonist and an mTOR inhibitor.

In some embodiments, the mTOR inhibitor is any one of rapamycin, deforolimus, temsirolimus, everolimus, ridaforolimus, Torin1, BEZ-235, or any combination thereof. Each possibility is a separate embodiment.

In some embodiments, the mTOR inhibitor is everolimus; in some embodiments, the ECR antagonist is a CB1 antagonist.

In some embodiments, the CB1 antagonist is any one of AM251, rimonabant, TM38837, JD-5034, SR147778, NESS 0327, LY-320135, AM281, Cannabigerol, Ibipinabant, Otenabant, Tetrahydrocannabivarin, Virodhamine, or any combination thereof. Each possibility is a separate embodiment.

In some embodiments, the neoplasm is a Neuroendocrine Neoplasm (NEN); in some embodiments, the NEN is an unresectable NEN; in some embodiments, the unresectable NEN is an unresectable metastatic NEN; in some embodiments, the NEN is developed anywhere in the body; in some embodiments, the NEN is a pancreatic NENs or a lung NEN; in some embodiments, the NEN is a pancreatic NENs; in some embodiments, the NEN is a lung NEN.

In some embodiments, the neoplasm is a resistant neoplasm; in some other embodiments, the resistant neoplasm is resistant to mTOR inhibition alone; in some embodiments, the neoplasm is a resistant neoplasm, and wherein the resistant neoplasm is resistant to mTOR inhibition alone.

In some embodiments, the composition for use wherein administration of ECR antagonist and an mTOR inhibitor reduces or prevents drug resistance to the mTOR inhibitor.

In some embodiments, the composition for use wherein the neoplasm is a resistant neoplasm; in some embodiments, the composition for use wherein the neoplasm is a resistant neoplasm and wherein the resistant neoplasm is resistant to mTOR inhibition alone.

In some embodiments the treatment promotes one or more of: reduction in neoplasm tumor biomass, reduction in neoplasm cell proliferation, transitioning of neoplasm cells to a state of cell cycle arrest, reduction in neoplasm cell viability, increase in neoplasm cell apoptosis, and/or reduction in neoplasm cell necrosis; or any combination thereof. Each possibility is a separate embodiment.

According to some aspects, there is provided a composition comprising an ECR antagonist and an mTOR inhibitor.

In some embodiments, the mTOR inhibitor is selected from rapamycin, deforolimus, temsirolimus, everolimus, ridaforolimus, Torin1, BEZ-235, or any combination thereof.

In some embodiments, the ECR antagonist is a CB1 antagonist.

In some embodiments, the CB1 antagonist is selected from AM251, rimonabant, TM38837, JD-5034, SR147778, NESS 0327, LY-320135, AM281, Cannabigerol, Ibipinabant, Otenabant, Tetrahydrocannabivarin, Virodhamine, or any combination thereof.

According to some aspects there is provided a method for reducing or preventing drug resistance to mTOR inhibitor in a subject suffering from a neoplasm, the method comprising administering to a subject in need thereof an endocannabinoid receptor (ECR) antagonist and an mTOR inhibitor, and wherein the administration of the ECR antagonist and mTOR inhibitor reduces or prevents drug resistance to mTOR inhibition.

According to some aspects there is provided a method for reducing or preventing drug resistance to mTOR inhibitor in a subject suffering from a resistant neoplasm, the method comprising administering to a subject in need thereof an endocannabinoid receptor (ECR) antagonist and an mTOR inhibitor, and wherein the administration of the ECR antagonist and mTOR inhibitor reduces or prevents drug resistance to mTOR inhibition.

In some embodiments, the mTOR inhibitor is selected from rapamycin, deforolimus, temsirolimus, everolimus, ridaforolimus, Torin1, BEZ-235, or any combination thereof.

In some embodiments, the ECR antagonist is a CB1 antagonist.

In some embodiments, the CB1 antagonist is selected from AM251, rimonabant, TM38837, JD-5034, SR147778, NESS 0327, LY-320135, AM281, Cannabigerol, Ibipinabant, Otenabant, Tetrahydrocannabivarin, Virodhamine, or any combination thereof.

In some embodiments, the neoplasm is a Neuroendocrine Neoplasm (NEN); in some embodiments, the NEN is an unresectable NEN; in some embodiments, the unresectable NEN is an unresectable metastatic NEN; in some embodiments, the NEN is developed anywhere in the body; in some embodiments, the NEN is a pancreatic NENs or a lung NEN; in some embodiments, the NEN is a pancreatic NENs; in some embodiments, the NEN is a lung NEN.

In some embodiments, the ECR antagonist and the mTOR inhibitor are administered concomitantly and/or sequentially. Each possibility is separate embodiment.

In some embodiments, the neoplasm is a resistant neoplasm, wherein the resistant neoplasm is resistant to mTOR inhibition alone.

In some embodiments, the neoplasm differentially expresses one or more genes of the group consisting of: FABP1, EIF3C, MT-ATP8, MUC2, PGGHG, SIK1B, EGR3, and MIR483; in some embodiments, differential expression of the one or more genes comprises a change of at least (−/+) 0.5-fold relative to control or to the expression before the administration of ECR antagonist and the mTOR inhibitor.

In some embodiments, the resistant neoplasm differentially expresses one or more genes of the group consisting of: FABP1, EIF3C, MT-ATP8, MUC2, PGGHG, SIK1B, EGR3, and MIR483; in some embodiments, differential expression of the one or more genes comprises a change of at least (−/+) 0.5-fold relative to control or to the expression before the administration of ECR antagonist and the mTOR inhibitor. Each possibility is a separate embodiment.

In some embodiments, the neoplasm differentially expresses one or more genes of the group consisting of: FABP1, EIF3C, MT-ATP8, and MUC2, and one or more genes of the group consisting of: PGGHG, SIK1B, EGR3, and MIR483; in some embodiments the two groups comprise opposite patterns of expression of the one or more differentially expressed genes; in some embodiments differential expression of the one or more genes comprises a change of at least (−/+) 0.5-fold relative to control or to the expression before the administration of ECR antagonist and the mTOR inhibitor.

In some embodiments, the opposite patterns of expression of the one or more differentially expressed genes in a neoplasm comprises downregulation of one or more genes of the group consisting of: FABP1, EIF3C, MT-ATP8, and MUC2, and upregulation of one or more genes of the group consisting of: PGGHG, SIK1B, EGR3, and MIR483;

In some embodiments, the resistant neoplasm differentially expresses one or more genes of the group consisting of: FABP1, EIF3C, MT-ATP8, and MUC2, and one or more genes of the group consisting of: PGGHG, SIK1B, EGR3, and MIR483; in some embodiments the two groups comprise opposite patterns of expression of the one or more differentially expressed genes; in some embodiments differential expression of the one or more genes comprises a change of at least (−/+) 0.5-fold relative to control or to the expression before the administration of ECR antagonist and the mTOR inhibitor.

In some embodiments, the opposite patterns of expression of the one or more differentially expressed genes in a resistant neoplasm comprises upregulation of one or more genes of the group consisting of: FABP1, EIF3C, MT-ATP8, and MUC2, and downregulation of one or more genes of the group consisting of: PGGHG, SIK1B, EGR3, and MIR483.

In some embodiment, differential expression of the one or more genes comprises a change of at least at least (−/+) 1.1-fold, (−/+) 1.25-fold, (−/+) 1.5-fold, (−/+) 1.75-fold, (−/+) 2.0-fold, (−/+) 2.5-fold, (−/+) 3-fold, (−/+) 3.5-fold, (−/+) 4-fold, (−/+) 5-fold, or more, relative to control or to the expression before the administration of ECR antagonist and the mTOR inhibitor. Each possibility is a separate embodiment.

In some embodiment, differential expression of the one or more genes comprises a change of at least 0.1-fold, 0.25-fold, 0.5-fold, 0.75-fold, 1.25-fold, 1.5-fold, 1.75-fold, 2-fold, 3-fold, 4-fold, or more, relative to control or to the expression before the administration of ECR antagonist and the mTOR inhibitor. Each possibility is a separate embodiment.

In some embodiments, reduction or prevention of drug resistance is associated with reduction in neoplasm tumor biomass, reduction in neoplasm cell proliferation, transitioning of neoplasm cells to a state of cell cycle arrest, reduction in neoplasm cell viability, increase in neoplasm cell death/apoptosis, and/or reduction in neoplasm cell necrosis; or any combination thereof. Each possibility is a separate embodiment.

In some embodiments, reduction in neoplasm tumor biomass comprises reduction in any one of: tumor volume, tumor weight, tumor area and/or tumor radiance; or any combination thereof. Each possibility is a separate embodiment.

In some embodiments, reduction in any one of: tumor volume, tumor weight, tumor area and/or tumor radiance is additive to the treatment with ECR antagonist and an mTOR inhibitor with respect to treatment with each agent alone.

In some embodiments, reduction in any one of: tumor volume and/or tumor weight, is additive to the treatment with ECR antagonist and an mTOR inhibitor with respect to treatment with each agent alone. Each possibility is a separate embodiment.

In some embodiments, reduction in tumor volume is additive to the treatment with ECR antagonist and an mTOR inhibitor with respect to treatment with each agent alone; in some embodiments, reduction in tumor weight is additive to the treatment with ECR antagonist and an mTOR inhibitor with respect to treatment with each agent alone.

According to some aspects, there is provided a kit for treating a neoplasm, the kit comprising a first composition comprising a therapeutically effective amount of an ECR antagonist and a second composition comprising a therapeutically effective amount of an mTOR inhibitor.

In some embodiment, the first composition comprising the ECR antagonist and the second composition comprising the mTOR inhibitor are administered concomitantly and/or sequentially. Each possibility is a separate embodiment.

In some embodiments, the first composition comprising ECR antagonist is administered concomitantly; in some embodiments, the first composition comprising ECR antagonist is administered sequentially; in some embodiments, the second composition comprising mTOR inhibitor is administered concomitantly; in some embodiments, the second composition comprising mTOR inhibitor is administered sequentially. Each possibility is a separate embodiment.

According to some aspects, there is provided a method for treating neoplasm comprising administering to a subject in need thereof an endocannabinoid receptor (ECR) antagonist and an mTOR inhibitor.

According to some embodiments, the mTOR inhibitor is selected from rapamycin, deforolimus, temsirolimus, everolimus, ridaforolimus, Torin1, BEZ-235, or any combination thereof.

According to some embodiments, the ECR antagonist is a CB1 antagonist.

According to some embodiments, the CB1 antagonist is selected from AM251, rimonabant, TM38837, JD-5034, SR147778, NESS 0327, LY-320135, AM281, Cannabigerol, Ibipinabant, Otenabant, Tetrahydrocannabivarin, Virodhamine, or any combination thereof.

According to some embodiments, the neoplasm is a Neuroendocrine Neoplasm (NEN).

According to some embodiments, the NEN is an unresectable NEN. According to some embodiments, the unresectable NEN is unresectable metastatic NENs.

According to some embodiments, the NEN is developed anywhere in the body. According to some embodiments, the NEN is a pancreatic NEN or a lung NEN.

According to some embodiments, the ECR antagonist and the mTOR inhibitor are administered concomitantly and/or sequentially.

According to some aspects, there is disclosed a composition for use in the treatment of a neoplasm, the composition comprising a therapeutically effective amount of an ECR antagonist and an mTOR inhibitor.

According to some embodiments, the mTOR inhibitor is any one of rapamycin, deforolimus, temsirolimus, everolimus, ridaforolimus, Torin1, BEZ-235, or any combination thereof.

According to some embodiments, the ECR antagonist is a CB1 antagonist.

According to some embodiments, the CB1 antagonist is any one of AM251, rimonabant, SR147778, NESS 0327, LY-320135, AM281, Cannabigerol, Ibipinabant, Otenabant, Tetrahydrocannabivarin, Virodhamine, or any combination thereof.

According to some embodiments, the neoplasm is a Neuroendocrine Neoplasm (NEN). According to some embodiments, the NEN is an unresectable NEN. According to some embodiments, the NEN is a pancreatic or a lung NEN.

According to some embodiments, there is provided a composition comprising an ECR antagonist and an mTOR inhibitor.

According to some embodiments, the mTOR inhibitor is selected from rapamycin, deforolimus, temsirolimus, everolimus, ridaforolimus, Torin1, BEZ-235 or any combination thereof.

According to some embodiments, the ECR antagonist is a CB1 antagonist.

According to some embodiments, the CB1 antagonist is selected from AM251, rimonabant, SR147778, NESS 0327, LY-320135, AM281, Cannabigerol, Ibipinabant, Otenabant, Tetrahydrocannabivarin, Virodhamine, or any combination thereof.

According to some aspects, there is provided a method for reducing or preventing drug resistance to an mTOR inhibitor in a subject suffering from a neoplasm, the method comprising administering to a subject in need thereof an endocannabinoid receptor (ECR) antagonist.

According to some embodiments, the ECR antagonist is a CB1 antagonist.

According to some embodiments, there is disclosed a kit for treating a neoplasm, the kit comprising a first composition comprising a therapeutically effective amount of an ECR antagonist and a second composition comprising a therapeutically effective amount of an mTOR inhibitor.

Certain embodiments of the present disclosure may include some, all, or none of the above advantages. One or more technical advantages may be readily apparent to those skilled in the art from the figures, descriptions and claims included herein. Moreover, while specific advantages have been enumerated above, various embodiments may include all, some or none of the enumerated advantages.

In addition to the exemplary aspects and embodiments described above, further aspects and embodiments will become apparent by reference to the figures and by study of the following detailed descriptions.

BRIEF DESCRIPTION OF THE FIGURES

The invention will now be described in relation to certain examples and embodiments with reference to the following illustrative figures so that it may be more fully understood.

FIG. 1A. show three scatter dot plots presenting flow cytometry analyses of Neuroendocrine Neoplasms (NENs) cell lines of different origins (lung NCI-H727, pancreatic NET BON1, and pancreatic NET NT3) that were stained and sorted for expression of the endocannabinoid receptors CB1 and CB2 using florescent labeled antibodies. Each dot represents a single cell; cells that express CB1 are located above the horizontal line of the quadrats, and cells that express CB2 are located right to the vertical line of the quadrants.

FIG. 1B-1D. show fluorescent microscopy images of biopsies of NENs tumors from humans (lung NET H727 (FIG. 1B), pancreatic NET (PNET BON1) (FIG. 1C), and small intestine NET (SI-NET NT3) (FIG. 1D)) that were stained for the endocannabinoid receptors CB1 and CB2 using florescent labeled antibodies. CB1 or CB2 staining is marked in red and cell nucleuses counterstain is presented in blue. Quantification of the staining is presented in the bar graphs for negative staining control (NC), CB1 staining and CB2 staining. Stars mark statistically significant differences ($P<0.05$).

FIGS. 1E-1H. show bar charts presenting relative expression by RNAseq analysis of fresh NENs tumors (Pancreatic NET (PNET) or Lung NET (LNET)) and NENs lung cell lines (h727, h855, and h1770). Shown is the quantification of the relative expression of endocannabinoid receptors CB1 and CB2 (FIG. 1E) TRPV1 and TRPV2 (FIG. 1F), PPARγ and PPARα (FIG. 1G), and GPR55 (FIG. 1H).

FIGS. 2A-2E show graphs presenting the viability of NEN cell lines (NCI-H727 and PNET BON1) exposed to various cannabis extracts, CB1 and CB2 antagonists, Everolimus. or different combination thereof as indicated in the graphs. Cell viability was determined by colorimetric measurements using WST1 assay.

FIGS. 2A-2B show line graphs presenting quantification of the percentage of viable cells versus baseline (which is set as at 100% baseline value; black solid line). NEN cell lines PNET BON1 (Right) and NCI-H727 (Left) were exposed to various cannabis extracts (FIG. 2A) or Everolimus (RAD) (FIG. 2B) during an incubation period of over 72 hrs. Each of the cannabis extracts screened in FIG. 2A is represented by a continuous gray line. Potent extracts are marked by a broken gray line.

FIGS. 2C-2D show bar charts presenting quantification of the percentage of viable cells versus baseline (which is set as at 100% baseline value; left bar marked as cells, untreated). Endocannabinoid receptors CB1 and/or CB2 were blocked using specific inhibitors (CB1 and/or CB2 inhibition), and cell viability of NEN cell lines PNET BON1 (Right) and NCI-H727 (Left) was assessed, either following exposure of the cells to a beneficial cannabis extract (marked as 82) (FIG. 2C) or without exposure to the beneficial cannabis extract (FIG. 2C and summarized again in FIG. 2D). Results are presented as mean±standard deviation for each group.

FIG. 2E shows line graphs presenting the viability of NENs cell lines (NCI-H727) treated with Everolimus alone or in combination with CB1 blocker, or with different beneficial cannabis extracts (marked as CE82 and CE32). The quantification is presented as the percentage of viable cells versus baseline (which is set as a 100% baseline value; cells treated with 0.5% DMSO).

FIG. 3A shows scatter dot plot presenting quantifications of FACS analysis examining apoptosis and necrosis of NEN cells (NCI-H727 and PNET BON1) following CB1 blocking, using annexin (marker for apoptosis; Y-axis of scatter plot) and propidium iodide PI (marker for necrosis; X-axis of scatter plot). In the dot plots, each dot represents a single cell; apoptotic cells are located above the horizontal line of the quadrats, necrotic cells are located right to the vertical line of the quadrants.

FIG. 3B shows bar charts presenting quantification of the results of FIG. 3A in NCI-H727 cells treated with 10 uM or 30 uM CB1 antagonist, or untreated cells. bars are presented with mean±standard deviation.

FIG. 3C shows bar charts presenting quantification of the results of similar experiments to the one presented in FIG. 3A in PNET BONE cells treated with 30 uM or 60 uM CB1antagonist, or untreated cells. bars are presented with mean±standard deviation.

FIGS. 4A-4B show graphs of the relative amount of proliferating cells during 6 to 8 cycles of cell multiplication (indicated as 6 to 8 generations) of NCI-H727 cells (FIG. 4A) and PNET BON-1 cells (FIG. 4B)

FIGS. 4C-4D show a stack charts presenting analysis of cell cycles phase of NCI-H727 cells (FIG. 4C) and PNET BON-1 cells (FIG. 4D).

FIG. 4E shows a histogram of cell cycle phase analysis of NCI-H727 cells comparing between untreated cells (Up) and cells treated with a combination of CB1 antagonist with Everolimus (Bottom).

FIG. 5A schematically illustrates the generation and experimental setup of the in-vivo NEN xenograft model using lung NCI-H727.

FIG. 5B shows a representative image of SCID mice having tumor xenograft treated with RAD001 alone (left) or RAD001 with CB1 inhibitor AM251 (right).

FIG. 5C shows a graph of the change in tumor size by tumor volume. Tumor size is presented versus the initial tumor size (set at 100% at baseline for each animal).

FIG. 5D shows a bar chart of the change in tumor size by tumor weight.

FIG. 7A schematically illustrates the generation and experimental setup of the in-vivo NENs reporter xenograft model using lung NCI-H727 cells.

FIG. 7B presents representative images of xenografts of mice going through live imaging using the in-vivo imaging system (IVIS).

FIG. 7C shows bar charts presenting dimensions/size of tumors evaluated by standard measurements of volume (Left) and weight (Right), in mice treated with Everolium (RAD001) alone or combined with CB1 antagonist (AM251).

FIG. 7D shows bar charts presenting dimensions/size of tumors evaluated by area (Left) and average radiance (Right) using the high-resolution in-vivo imaging system (IVIS). BL-baseline; +7 d—seven days from baseline.

FIG. 7E shows bar charts comparing between measurement of tumor biomass performed using standard method for evaluation of tumor growth/size and evaluation using the IVIS measurement.

FIG. 8A shows overview of the results obtained from the in-vivo RNA sequencing analysis, showing sets of genes which are upregulated (arrows facing up) and downregulated (arrows facing down) between the different groups of treatments including CB1 antagonists, mTOR inhibitors, the combination of CB1 antagonist and mTOR inhibitor, and control (PBS-treated or untreated). The statistical cutoff was 0.01.

FIG. 8B shows a heatmap generated by comparing expression of genes differentially expressed (with a cutoff of 0.25-fold change) between the two groups of treatment that include mTOR inhibitor (Eve) and combination of mTOR inhibitor with CB1 antagonist (Eve+AM251). The differential heatmap represent a unique signature comprising a group of 8 differentially expressed genes that can be divided to two sets having a unique, but opposite, pattern of expression and includes: a first set of 4 genes [FABP1, EIF3C, MT-ATP8, and MUC2] that are upregulated in samples treated with mTOR inhibitor alone and are downregulated in samples treated with the combination of mTOR inhibitor with CB1 antagonist with respect to the control, and a second set of 4 genes [PGGHG, SIK1B, EGR3, and MIR483] that are downregulated in samples treated with mTOR inhibitor alone and are upregulated in samples treated with the combination of mTOR inhibitor with CB1 antagonist with respect to the control (PBS-treated or untreated).

FIG. 8C illustrates two biological processes revealed by performing ontology (GO)/pathway enrichment analysis to the 8 differentially expressed genes. The activity of those genes was found to be enriched in Type 1 diabetes and negative regulation of carbohydrate metabolism, biological processes which are related to glycolysis by tumor cells possibly as part of Warburg effect.

DETAILED DESCRIPTION

Figure 1A:
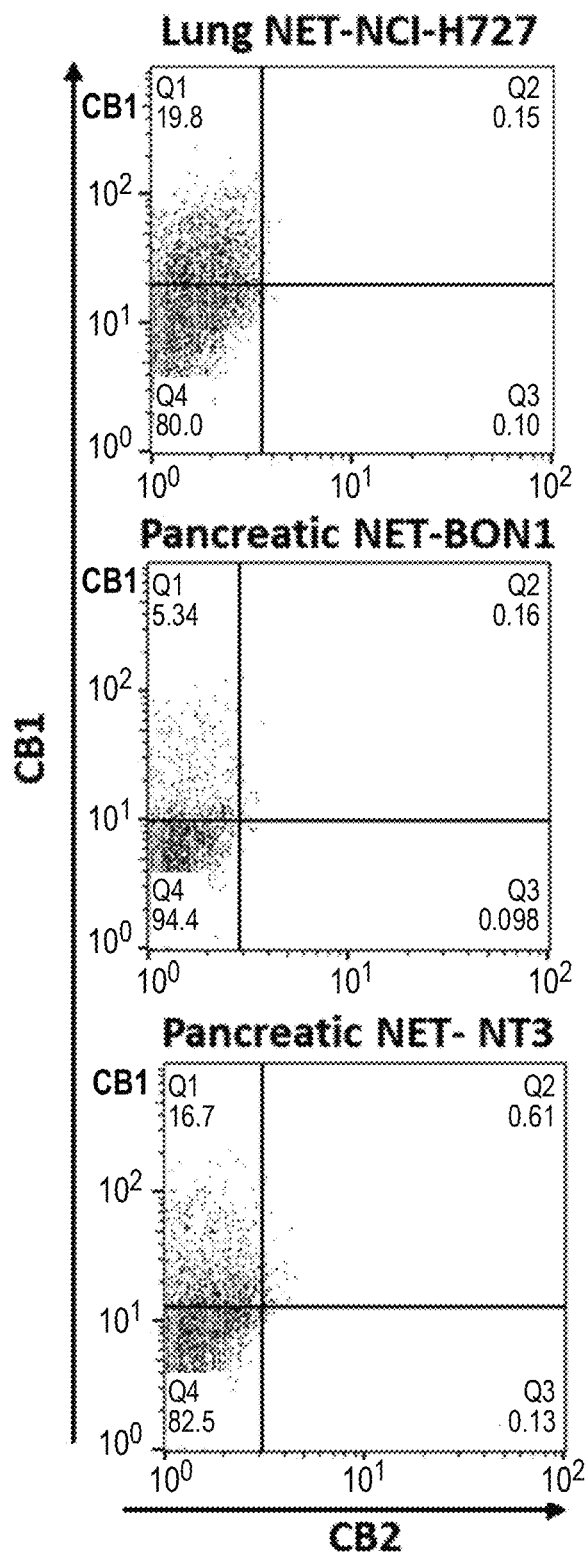
FIGS. 1A-1H show analyses of the expression of endocannabinoid receptors CB1 and CB2 in NENs cells lines, human primary tumor samples using immunostaining, and fresh biopsies using RNAseq.

In the following description, various aspects of the disclosure will be described. For the purpose of explanation, specific configurations and details are set forth in order to provide a thorough understanding of the different aspects of the disclosure. However, it will also be apparent to one skilled in the art that the disclosure may be practiced without specific details being presented herein. Furthermore, well-known features may be omitted or simplified in order not to obscure the disclosure.

Definitions

The following definitions and methods are provided to better define the present invention and to guide those of ordinary skill in the art in the practice of the present invention. Unless otherwise noted, terms are to be understood according to conventional usage by those of ordinary skill in the relevant art.

Unless defined otherwise, all technical and scientific terms used herein have the same meaning as is commonly understood by one of skill in the art to which the invention(s) belong.

Where a term is provided in the singular, the inventors also contemplate aspects of the invention described by the plural of that term.

As used herein, the singular forms "a," "an" and "the" include plural referents unless the context clearly dictates otherwise.

As used herein, the term "about" may be used to specify a value of a quantity or parameter (e.g. the length of an element) to within a continuous range of values in the neighborhood of (and including) a given (stated) value. According to some embodiments, "about" may specify the value of a parameter to be between 80% and 120% of the given value. For example, the statement "the length of the element is equal to about 1 m" is equivalent to the statement "the length of the element is between 0.8 m and 1.2 m". According to some embodiments, "about" may specify the value of a parameter to be between 90% and 110% of the given value. According to some embodiments, "about" may specify the value of a parameter to be between 95% and 105% of the given value.

As used herein, according to some embodiments, the terms "substantially" and "about" may be interchangeable.

As used herein, "about the same" means within an amount that one of skill in the art would consider to be the same or to be within an acceptable range of error. For example, typically, for pharmaceutical compositions, within at least 1%, 2%, 3%, 4%, 5% or 10% is considered about the same. Such amounts can vary depending upon the tolerance for variation in the particular composition by subjects.

As used herein, "optional" or "optionally" means that the subsequently described event or circumstance does or does not occur, and that the description includes instances where said event or circumstance occurs and instances where it does not.

The terms "subject", "patient" or "individual" generally refer to a human, although the methods of the invention are not necessarily limited to humans and should be useful in other mammals.

As used herein, the term "neoplasm" refers to abnormal and excessive growth of tissue.

As used herein, the term "neuroendocrine neoplasm" (NEN) refers to neoplasms that begin in neuroendocrine cells, known also as neuroendocrine tumor (NET). Neuroendocrine neoplasia may be well or poorly differentiated, with diverse incidence and prevalence in different organs. It is proposed that the well-differentiated neoplasm is universally defined as neuroendocrine tumor (NET) and the poorly differentiated as neoplasm neuroendocrine carcinoma (NEC). According to some embodiments, Neuroendocrine neoplasms (NENs) occur anywhere in the body, including for example, but not limited to pituitary, head and neck, thyroid, parathyroid, lung, thymus, GI tract, pancreas, kidney, adrenal, ovaries, skin, and uterus. Most neuroendocrine neoplasms occur in the gastrointestinal tract (e.g., appendix, small intestine, colon, rectum and pancreas) and in the lungs. As used herein, the terms NENs, NET and NEC may be interchangeably used referring to cancer that begin in neuroendocrine cells and may metastasize.

According to some embodiments, the NENs is pituitary NENs, head and neck NENs, thyroid NENs, parathyroid NENs, lung NENs, thymus NENs, GI tract NENs, appendix NENs, small intestine (SI) NENs, colon NENs, rectum NENs, pancreas NENs, kidney NENs, adrenal NENs, ovaries NENs, skin NENs and uterus NENs. Each possibility is a separate embodiment.

As used herein, for example, the term "Gastrointestinal (GI) tract NENs" refers to NENs that develop in the large intestine, small intestine, and appendix; the term "lung NENs" refer to NENs that develop in the respiratory system; and the term "pancreatic NENs" refer to NENs that develop in the pancreas.

As used herein, the term "resistant neoplasm" refers to a neoplasm not responding as would be expected by one having ordinary skills in the art of medicine to treatment with conventional drugs according to standard protocols.

As used herein, the term "endocannabinoid receptor", "cannabinoid receptor" and "ECR" may be used interchangeably and refer to a class of cell membrane receptors in the G protein-coupled receptor superfamily. As is typical of G protein-coupled receptors, the cannabinoid receptors contain seven transmembrane spanning domains. Cannabinoid receptors are activated by three major groups of ligands: endocannabinoids, produced by the mammillary body; plant cannabinoids (such as Tetrahydrocannabinol, produced by the cannabis plant); and synthetic cannabinoids (such as HU-210).

There are currently two known subtypes of cannabinoid receptors, termed CB1 and CB2. The CB1 receptor (i.e., cannabinoid receptor type 1) is expressed mainly in the brain (central nervous system or "CNS"), but also in the lungs, liver, kidneys and other organs. The CB2 receptor (i.e., cannabinoid receptor type 2) is expressed mainly in the immune system and in hematopoietic cells.

The protein sequences of CB1 and CB2 receptors are about 44% similar. When only the transmembrane regions of the receptors are considered, amino acid similarity between the two receptor subtypes is approximately 68%.

As used herein, the terms "antagonist" and "receptor antagonist" may be used interchangeably and refers to receptor ligands and drug that block or dampens a biological response by binding to and blocking, or otherwise interfering with a receptor or attenuating/inhibiting its downstream signaling, rather than activating it. In pharmacology, antagonists have affinity but no efficacy for their cognate receptors, and binding will disrupt the interaction and inhibit the function of an agonist. Antagonists mediate their effects by binding to the active site or to the allosteric site on a receptor, or they may interact at unique binding sites not normally involved in the biological regulation of the receptor's activity. Antagonist activity may be reversible or irreversible depending on the longevity of the antagonist-receptor complex, which, in turn, depends on the nature of antagonist-receptor binding. The majority of drug antagonists achieve their potency by competing with endogenous ligands or substrates at structurally defined binding sites on receptors.

As used herein, the term "mTOR inhibitor" refers to a class of drugs that inhibit the mechanistic target of rapamycin (mTOR), which is a serine/threonine-specific protein kinase that belongs to the family of phosphatidylinositol-3 kinase (PI3K) related kinases (PIKKs). Non-limiting examples of mTOR inhibitors include rapamycin, deforolimus (AP23573), everolimus (RAD001), temsirolimus (CCI-779), ridaforolimus, Torin1, and BEZ-235.

As used herein, the terms "CB1 receptor antagonist", "CB1 antagonist" and CB1 inhibitor" may be used interchangeably and refer to agents that selectively block, interfere/attenuate the CB1 receptor.

Non-limiting examples of CB1 inhibitors include AM251, rimonabant, TM38837, JD-5034, SR147778, NESS 0327, LY-320135, AM281, Cannabigerol, Ibipinabant, Otenabant, Tetrahydrocannabivarin, Virodhamine, or any combination thereof.

According to some embodiments, the CB1 inhibitor includes for example, but is not limited to, one or more of AM251, rimonabant, TM38837, JD-5034, SR147778, NESS 0327, LY-320135, AM281, Cannabigerol, Ibipinabant, Otenabant, Tetrahydrocannabivarin, and Virodhamine. Each possibility is a separate embodiment.

As referred to herein, the terms "treating" and "treatment" refer to obtain beneficial or desired therapeutic results as a result of the administering of the herein disclosed compositions. Beneficial or desired therapeutic results include, but are not limited to, alleviation or amelioration of one or more symptoms associated with an infectious disease, delaying or slowing down the propagation of the disease, amelioration, palliation or stabilization of said disease, among other beneficial results. For example, according to some embodiments, administering the herein disclosed composition, comprising at least an ECR antagonist (for example, a CB1 antagonist), may be effective to ameliorate symptoms associated with a neoplasm, to lessen the severity the neoplasm, to cure the neoplasm, to prevent the neoplasm from occurring, prevent/inhibit the neoplasm from becoming more aggressive, prevent/inhibit the neoplasm from spreading, prevent/inhibit the drug resistance of the neoplasm. Each possibility is a separate embodiment.

Additionally, the term "treatment" as used herein refers to both therapeutic treatment and prophylactic or preventative measures. As used herein, the terms "prevent", "reduce", "attenuate", "ameliorate", "inhibit", "alleviate", or "ameliorate" may be used interchangeably.

In some embodiments, those in need of treatment include those already having a disorder (for example, neoplasm, NENs or a drug resistant neoplasm) as well as those in which a condition is to be prevented (for example, drug resistant NENs).

The term "administering" includes any method of delivery of a pharmaceutical composition or agent into a subject's system or to a particular region (e.g. the lungs or the pancreas or directly into neoplasm). In certain embodiments, the pharmaceutical composition disclosed herein is administered via intravenous route. As used herein, and as based on context, the terms "administration" or "administrations" encompass a singular or multiple instances, respectively. As used herein, "administration" is synonymous with "delivery".

As used herein, the term "treatment" also refers to a combined/dual treatment, and include treatment of the subject with a combination of one or more of an ECR antagonist (e.g. CB1 antagonist) and one or more mTOR inhibitor.

According to some embodiments, the treatment comprises concomitantly and/or sequentially administering to a subject in need thereof one or more of endocannabinoid receptor (ECR) antagonist in combination with one or more of an mTOR inhibitor, or compositions comprising the same. Each possibility is a separate embodiment.

As used herein, the terms "simultaneous" and "concomitantly" with regards to the combined treatment with the ECR antagonist and the mTOR inhibitor may be used interchangeably and refer to providing a single composition comprising both active ingredients, or to a simultaneous administration of the regents from separate sources/compositions.

As used herein, the term "sequentially" refers to administering the subject with the combined treatment of the ECR antagonist and the mTOR inhibitor in a sequential manner e.g., first administering the mTOR inhibitor or composition comprising same and then the ECR antagonist or composition comprising same or vice versa (i.e., first administering the ECR antagonist or composition comprising same and then the mTOR inhibitor or composition comprising same). It is understood by one of ordinary skill in the art that, in some embodiments, the sequential administration may refer to administering the first active ingredient and then essentially immediately after completion of the administration of the first agent or immediately after administration of the first agent and a rinse, administering the second agent. Alternatively, in some embodiments, the sequential administration may refer to a specific regimen of administration e.g., providing the first agent on a given day and then providing the second agent a predetermined period thereafter (e.g. about a week after, about two weeks after or about three weeks after providing the first agent), and then (e.g. a week after, two weeks after or three weeks after providing the second agent) once again administering the first agent and so on for a predetermined period of time. As yet another alternative, in some embodiments, the sequential administration may refer to a specific regimen of administration in which the first agent and second agent are provided immediately one after the other on a given day, while at other days only one of the agents is administered. As a non-limiting example, the mTOR inhibitor may be administered once a week while the CB1 antagonist may be administered once every three weeks such that every three weeks the mTOR inhibitor and the CB1 antagonist are administered on the same day. As yet another alternative, in some embodiments, the sequential administration may refer to completing the treatment of the first agent and then, after completion (e.g., after 6 months after 1 year or after remission or other change in the status of the neoplasm initiating, the treatment of the second agent is commenced.

As used herein, the term "sequential and simultaneous" may refer to a treatment regimen in which the two agents at times (e.g. every two weeks or every three weeks) are administered simultaneously (e.g. in a same composition) and at times separately (e.g. only one of the agents) or both in a sequential manner as defined herein above.

The term "pharmaceutical composition" is intended to be used herein in its broader sense to include preparations containing the composition used for therapeutic purposes. Accordingly, the pharmaceutical composition contains a therapeutic amount of the active ingredient, namely, the ECR antagonist. The pharmaceutical compositions may be formulated in a conventional manner using one or more physiologically acceptable carriers, which facilitate processing of the active compounds into preparations that can be used pharmaceutically. Proper formulation is dependent upon the route of administration chosen.

The term "pharmaceutically acceptable excipient" as used herein is exchangeable with the term "pharmaceutically acceptable carrier" and refers to any and all solvents, dispersion media, preservatives, antioxidants, coatings, isotonic and absorption delaying agents, surfactants, buffer, a stabilizing agent, and the like that are compatible with pharmaceutical administration. The use of such media and agents in pharmaceutical compositions is well known in the art. The compositions may contain other active compounds providing supplemental, additional, or enhanced therapeutic functions.

As used herein, the term "therapeutically effective amount" is exchangeable with any one of "therapeutically effective dose" or "sufficient/effective amount or dose," and refers to a dose that produces the required therapeutic effects. Specifically, an effective dose generally refers to the amount of the composition disclosed herein sufficient to treat and/or ameliorate neoplasms. An effective dose may refer to the amount of the composition sufficient to delay or halt the progression of a neoplasm. An effective dose may also refer to the amount of the composition that provides a therapeutic benefit in the treatment or management of neoplasm. In addition, an effective dose may be the amount with respect to the composition alone, or in combination with other therapies (e.g. an mTOR inhibitor), that provides a therapeutic benefit in the treatment or management of the neoplasm. The exact effective dose depends inter alia on the purpose of the treatment, the tolerance of the subject and the stage of the neoplasm and is ascertainable by one skilled in the art using known techniques.

According to some embodiments, the term "transport vehicle" refers to the delivery platform used for the administration of the composition. Non-limiting examples of delivery platforms include a delivery molecule, an exosome, liposomes, micelles/polymeric micelles, nanoparticles (for example, a polymeric and lipid-based nanoparticle), nanoemulsions and nanosuspensions, microspheres, microcapsules, dendrimers, protein-drug complexes (for example, a conjugated peptide or protein), protein-DNA complexes, and the like. Each possibility is a separate embodiment.

In some embodiments, the composition comprises a transport vehicle.

As used herein, the term "liposomes" refers to microscopic vesicles having an interior aqua space sequestered from an outer medium by a membrane of one or more bilayers. Bilayer membranes of liposomes are typically formed by amphiphilic molecules, such as lipids of synthetic or natural origin that comprise spatially separated hydrophilic and hydrophobic domains. The herein disclosed composition may be located in the interior space of the liposome, within the bilayer membrane of the liposome, or associated with the exterior surface of the liposome membrane. The liposome may facilitate or assist in the delivery of the composition or the active ingredient (e.g. ECR antagonist and/or mTOR inhibitor) into a target cell. The liposome may also protect the active ingredient from an environment which may contain enzymes or chemicals that degrade the active ingredient.

As used herein, a "nanoparticle" refers to a colloidal particle for delivery of an active ingredient that is microscopic in size of between or about between 1 and 1000 nanometers (nm), such as between 1 and 100 nm and behave as a whole unit in terms of transport and properties. Nanoparticles include those that are uniform in size.

According to some embodiments, the nanoparticle may be a lipid nanoparticle. As used herein, the term "lipid nanoparticle" refers to a transfer vehicle comprising one or more lipids (e.g., cationic lipids, non-cationic lipids, and PEG-modified lipids). Preferably, the lipid nanoparticles are formulated to deliver decoy transcript into target cells.

Examples of suitable lipids include, for example, the phosphatidyl compounds (e.g., phosphatidylglycerol, phosphatidylcholine, phosphatidylserine, phosphatidylethanolamine, sphingolipids, cerebrosides, and gangliosides). Also contemplated is the use of polymers as transfer vehicles, whether alone or in combination with other transfer vehicles. Suitable polymers may include, for example, polyacrylates, polyalkycyanoacrylates, polylactide, polylactide-polyglycolide copolymers, polycaprolactones, dextran, albumin, gelatin, alginate, collagen, chitosan, cyclodextrins, dendrimers and polyethylenimine.

According to some embodiments, there is provided a method for treating a neoplasm and/or for reducing or preventing drug resistance to an mTOR inhibitor, the method comprising administering to a subject in need thereof one or more of an endocannabinoid receptor (ECR) antagonist; in some embodiments, the method further comprises administering to the subject an mTOR inhibitor. Each possibility is a separate embodiment.

According to some embodiments, there is provided a method for treating a neoplasm and/or for reducing or preventing drug resistance to an mTOR inhibitor, the method comprising administering to a subject in need thereof one or more of an endocannabinoid receptor (ECR) antagonist and one or more of mTOR inhibitor. Each possibility is a separate embodiment.

According to some embodiments, the ECR antagonist is a CB1 antagonist. Non-limiting examples of suitable CB1 antagonists include AM251, rimonabant, TM38837, JD-5034, SR147778, NESS 0327, LY-320135, AM281, Cannabigerol, Ibipinabant, Otenabant, Tetrahydrocannabivarin, Virodhamine, or any combination thereof. Each possibility is a separate embodiment.

Non-limiting examples of mTOR inhibitors include rapamycin, deforolimus (AP23573), everolimus (RAD001), and temsirolimus (CCI-779), ridaforolimus, Torin1, BEZ-235. Each possibility is a separate embodiment.

According to some embodiments, the ECR antagonist and the mTOR inhibitor are administered concomitantly and/or sequentially. Each possibility is a separate embodiment.

According to some embodiments, the compositions may be administered by parenteral, intrapulmonary, intramuscular, intravenous, intraarterial, intraperitoneal, intrathecal, intracranial, oral, or subcutaneous administration. Each possibility is a separate embodiment.

According to some embodiments, the composition or active ingredient (e.g. CB1 antagonist) is administered at least once. According to some embodiments, the administering comprises a single administration. According to some embodiments, the pharmaceutical composition is administered a plurality of times (e.g. weekly, biweekly or tri-weekly).

According to some embodiments, the composition or active ingredient is administered for a predetermined period. According to some embodiments, the duration of administration of the composition or active ingredient is determined based on an evaluation of the neoplasm. According to some embodiments, the duration of administration is for the remainder of the subject's life.

According to some embodiments, all administrations of the plurality of administrations include the same dose of the ECR antagonist and/or the mTOR inhibitor. According to some embodiments, the various administrations of the plurality of administrations include various doses of the ECR antagonist and/or the mTOR inhibitor.

According to some embodiments, there is provided a composition for use in the treatment of a neoplasm and/or for use in reducing or preventing drug resistance to an mTOR inhibitor, the composition comprising a therapeutically effective amount of one or more of an ECR antagonist.

According to some embodiments, a ECR antagonist is a CB1 antagonist. Non-limiting examples of suitable CB1 antagonists include AM251, rimonabant, TM38837, JD-5034, SR147778, NESS 0327, LY-320135, AM281, Cannabigerol, Ibipinabant, Otenabant, Tetrahydrocannabivarin, Virodhamine, or any combination thereof. Each possibility is a separate embodiment.

According to some embodiments, the composition further comprises a therapeutically effective amount of an mTOR inhibitor. Non-limiting examples of mTOR inhibitors include rapamycin, deforolimus (AP23573), everolimus (RAD001), and temsirolimus (CCI-779), ridaforolimus, Torin1, BEZ-235. Each possibility is a separate embodiment.

According to any one of the above embodiments, the pharmaceutical composition further comprises one or more pharmaceutically acceptable excipients.

In some embodiments, the pharmaceutically acceptable carrier may be any type of buffer or excipient suitable for administration. In some embodiments, the pharmaceutically acceptable carrier may be suitable for intravenous infusion. In some embodiments, the pharmaceutically acceptable carrier may be suitable as a cryoprotectant.

According to some embodiments, the ECR antagonist (CB1 antagonist) in the composition is in a dosage form suitable for intravenous delivery.

The compositions can be formulated into various compositions for any route of administration. well-known to the skilled person. The choice of the optimal route of administration of the pharmaceutical compositions is influenced by several factors including, e.g., the physio-chemical properties of the active molecules within the compositions, the severity of the neoplasm and the relationship of the plasma concentrations of the active molecules to the desired therapeutic effect. The preparations and pharmaceutical compositions disclosed herein are preferably formulated for intravenous administration.

Typically, pharmaceutical compositions must be sterile and stable under the conditions of manufacture and storage. The preparations and/or pharmaceutical compositions comprising the ECR antagonist and/or the mTOR inhibitor can be in powder form for reconstitution in the appropriate pharmaceutically acceptable excipient before or at the time of delivery. In the case of sterile powders for the preparation of sterile injectable solutions, the preferred methods of preparation are vacuum drying and freeze-drying (lyophilization) that yield a powder of the active ingredient plus any additional desired ingredient from a previously sterile-filtered solution thereof.

According to some embodiments, there is provided a kit for treating a neoplasm and/or for use in reducing or preventing drug resistance to an mTOR inhibitor, the kit comprising a first composition comprising a therapeutically effective amount of one or more an ECR antagonist and a second composition comprising a therapeutically effective amount of one or more of an mTOR inhibitor.

According to some aspects, there is provided a method for treating a subject with CB1 antagonist and an mTOR inhibitor, wherein the subject is suffering from neoplasm resistant to treatment with mTOR inhibitor alone, the method comprising the steps of:
  (i) determining differential expression of genes which are associated with the neoplasm resistance to mTOR inhibition by:

obtaining a sample of the neoplasm from the subject; and determining the expression of one or more genes of the group consisting of: FABP1, EIF3C, MT-ATP8, and MUC2, and one or more genes of the group consisting of: PGGHG, SIK1B, EGR3, and MIR483, to there by construed a pattern of differentially expressed genes of the subject which is associated with the neoplasm resistance to mTOR inhibition;

(ii) comparing the pattern of the differentially expressed genes of the subject with a predetermined signature of differentially expressed genes associated with neoplasms resistant to mTOR inhibition alone, and obtained from a plurality of resistant neoplasms; wherein the predetermined signature of differentially expressed genes associated with neoplasms resistant comprises: FABP1, EIF3C, MT-ATP8, MUC2, PGGHG, SIK1B, EGR3, and MIR483; and (iii) if the subject suffering from neoplasm resistant to treatment with mTOR inhibitor alone has the predetermined signature of differentially expressed genes associated with neoplasms resistant to mTOR inhibition alone, and obtained from a plurality of resistant neoplasms, then recommending to the subject an administration of CB1 antagonist and an mTOR inhibitor; and if the subject suffering from neoplasm resistant to treatment with mTOR inhibitor alone does not have the predetermined signature of differentially expressed genes associated with neoplasms resistant to mTOR inhibition alone, and obtained from a plurality of resistant neoplasms, then not recommending to the subject an administration of CB1 antagonist and an mTOR inhibitor.

In some embodiments, the pattern of differentially expressed genes of the subject which is associated with the neoplasm resistance to mTOR inhibition comprises upregulation of one or more genes of the group consisting of: FABP1, EIF3C, MT-ATP8, and MUC2, and downregulation of one or more genes of the group consisting of: PGGHG, SIK1B, EGR3, and MIR483.

Hereinbelow are some additional embodiments, including exemplified embodiments with reference. In some exemplified embodiments provided herein, treatment with ECR antagonist and/or mTOR inhibitor comprises a comparison with control or with neoplasm/cells treated with each agent alone; in some exemplified embodiments control comprises untreated cells or cells treated with PBS, DMSO or similar; in some embodiments, neoplasm comprises NENs; in some embodiments the ECR antagonists comprises a CB1 antagonist. Each possibility is a separate embodiment.

According to some exemplified embodiments, treatment with ECR antagonist and/or mTOR inhibitor promotes reduction in neoplasm cell viability and/or induction of neoplasm cell death; Each possibility is a separate embodiment.

Reference is now made to Example 2, FIGS. 2A-2E.

According to some exemplified embodiments, reduction in neoplasm viability comprises induction of apoptotic cell death; in some embodiments, treatment with ECR antagonist and/or mTOR inhibitor increases death by apoptosis of neoplasm cells; in some embodiments, treatment with ECR antagonist and/or mTOR inhibitor reduces the level of necrosis of neoplasm cells. Each possibility is a separate embodiment.

Figure 3A:
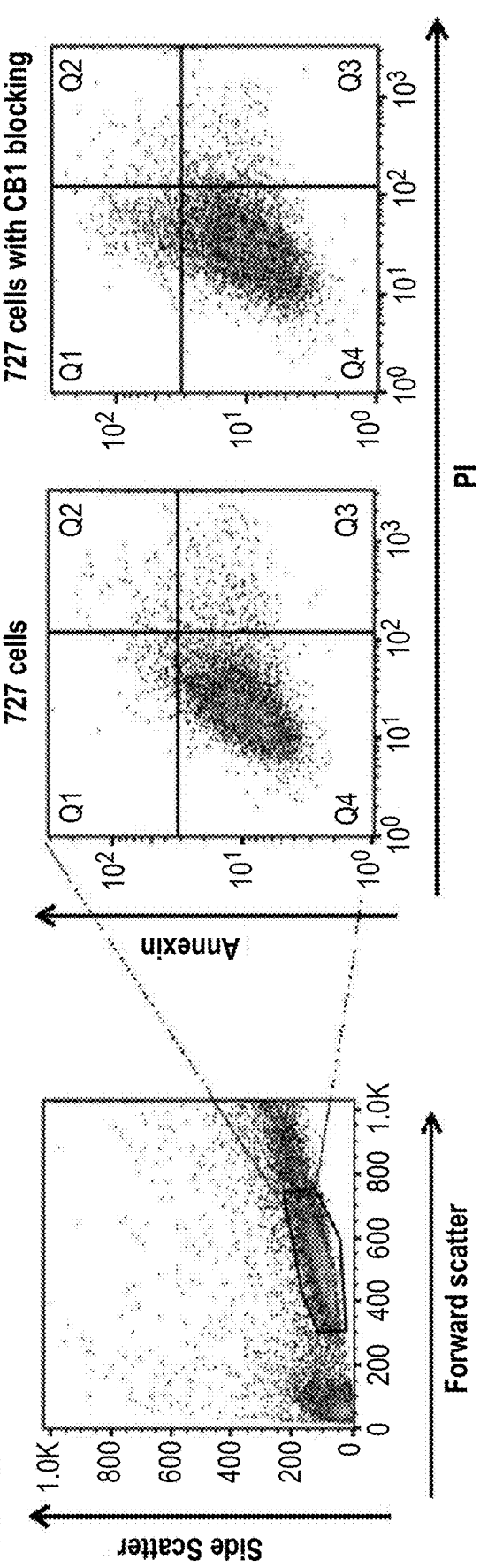
FIGS. 3A-3C show different analyses of the effect CB1 inhibition exerts on NENs cell death and viability.
Figure 3B:
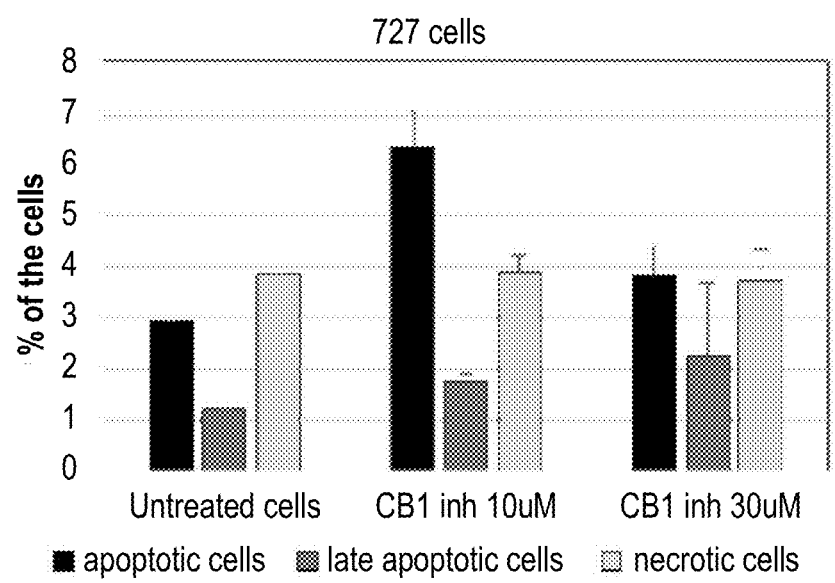
Figure 3C:
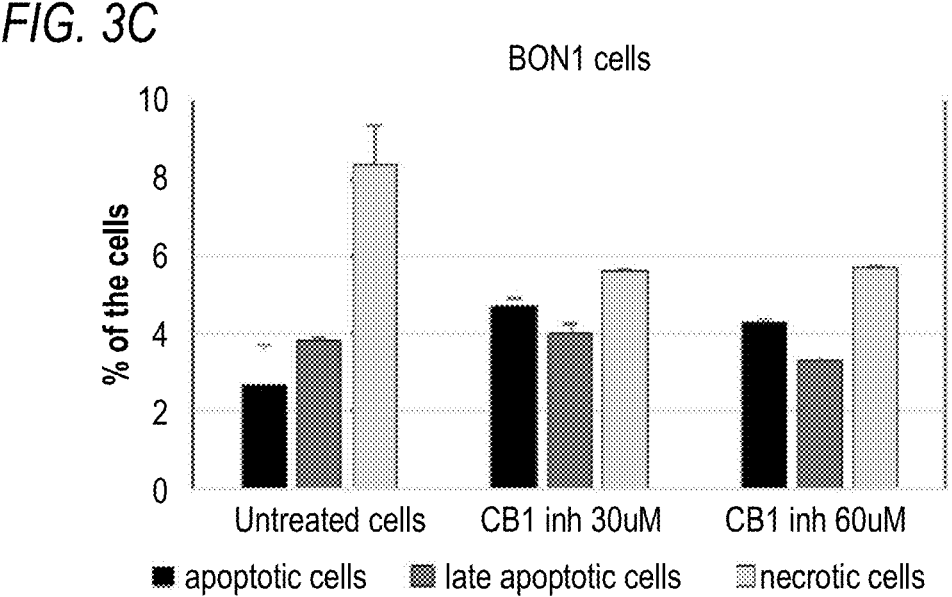

Reference is now made to Example 3, FIGS. 3A-3C.

Advantageously, according to some exemplified embodiments, treatment with ECR antagonist and/or mTOR inhibitor reduces the rate of proliferation of neoplasm cells; in some embodiments, reducing the rate of proliferation comprises promoting a shift in the cell cycle state towards cell arrest at G0/G1 phase; in additional embodiments, promoting cell/cell cycle arrest comprises promoting transition of neoplasm cells from existing in a state of S phase and G2 M phase to existing in a state of G0/G1 phase; in some embodiments the neoplasm is NENs. Each possibility is a separate embodiment.

Reference is now made to Example 4, FIGS. 4A-4E.

According to some exemplified embodiments, treatment with ECR antagonist and/or mTOR inhibitor promotes neoplasm/tumor cell arrest and/or attenuates the progression in neoplasm/tumor growth; in some embodiments, treatment with ECR antagonist and/or mTOR inhibitor attenuates or prevents increase in neoplasm/tumor size; in some embodiments, treatment with ECR antagonist and/or mTOR inhibitor reduces NEN tumor size, compared with control or neoplasm/tumor treated with each agent alone; in some additional embodiments, treatment with ECR antagonist and/or mTOR inhibitor attenuates or prevents the increase in tumor volume and/or tumor weight; in some embodiments, reduction in neoplasm/tumor size comprises reduction in tumor volume and/or weight compared with control or neoplasm/tumor treated with each agent alone; in some exemplified embodiments, treatment with ECR antagonist and/or mTOR inhibitor comprises a comparison with control or with neoplasm/cells treated with each agent alone; in some exemplified embodiments control comprises untreated cells or cells treated with PBS, DMSO or similar. Each possibility is a separate embodiment.

Advantageously and surprisingly, treatment with ECR antagonist and/or mTOR inhibitor exerts a strong inhibitory effect on neoplasm/tumor growth, volume and/or weight, compared with each treatment alone and in some exemplified embodiments thereof, the magnitude of the inhibitory effect is additive or synergistic compared with neoplasm treated with each agent alone;. Each possibility is a separate embodiment.

Reference is now made to Example 5, FIGS. 5A-5D and Example 7, FIGS. 7A-7E

Advantageously and surprisingly, in some exemplified embodiments, treatment with ECR antagonist and/or mTOR inhibitor prevents the overtime development of drug resistant neoplasm/tumor; in some embodiments, treatment with ECR antagonist and/or mTOR inhibitor reduces or prevents drug resistant neoplasm/tumor; in some additional embodiments reduction in drug resistant comprises a longer duration of positive response to treatment compared with neoplasm/cells treated with each agent alone; in some other embodiments reduction in drug resistant comprises less variability in the response of neoplasm/tumor to treatment with ECR antagonist and/or mTOR inhibitor; in some exemplified embodiments, treatment with ECR antagonist and/or mTOR inhibitor comprises a comparison with control or with neoplasm/cells treated with each agent alone; in some exemplified embodiments control comprises untreated cells or cells treated with PBS, DMSO or similar; in some embodiments the neoplasm is NENs. Each possibility is a separate embodiment.

Figure 6A:
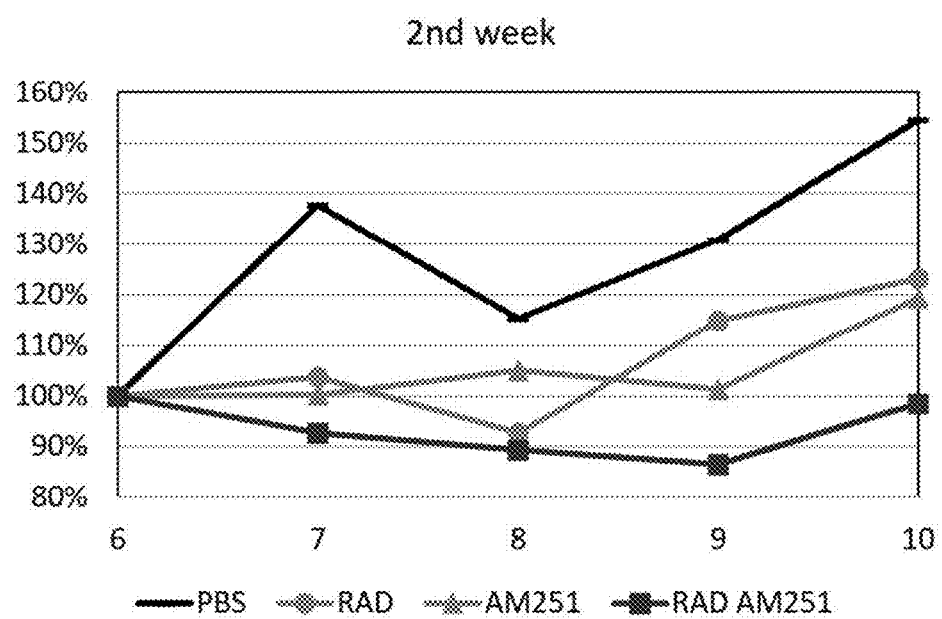
FIGS. 6A-6B presents the change in tumor dimensions/growth of lung NCI-H727 cells in an in vivo NENs xenograft model, as part of a resistance analysis performed on the same experiment/experimental setup described in FIGS. 5A-5D. Tumor xenografts were generated and treated as indicated. The graphs show the change in tumor size by volume at the beginning of the treatment (2$^{nd}$ week) (FIG. 6A) and at the end of treatment (4$^{th}$ week) (FIG. 6B). Tumor size is presented versus initial tumor size (set at 100% at baseline for each animal at the beginning of 2$^{nd}$ and 4$^{th}$ week).
Figure 6B:
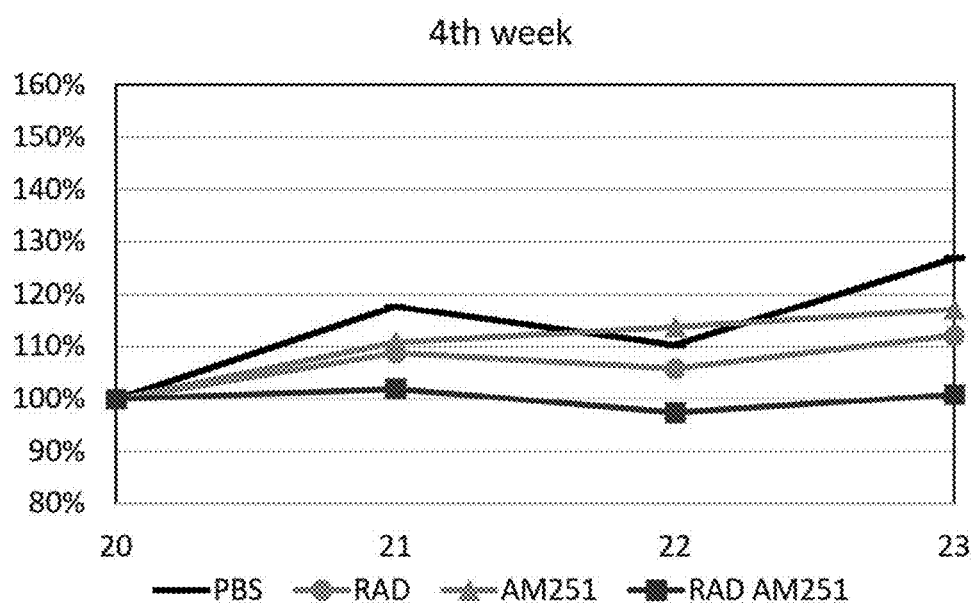

Reference is now made to Example 6, FIGS. 6A-6B.

According to some exemplified embodiments, treatment with ECR antagonist and mTOR inhibitor leads to a decrease in tumor biomass/weight; in some embodiments, the decrease in tumor biomass/weight comprises decreased tumor volume and/or decreased tumor weight; in some additional embodiments, the decrease in tumor biomass/ weight comprises decreased tumor area and/or decreased tumor radiance. Each possibility is a separate embodiment.

In some exemplified embodiments provided herein, treatment with ECR antagonist and/or mTOR inhibitor comprises a comparison with control or with neoplasm/cells treated with each agent alone; in some exemplified embodiments control comprises untreated cells or cells treated with PBS, DMSO or similar; in some embodiments neoplasm comprises NENs. Each possibility is a separate embodiment.

Figure 7A:
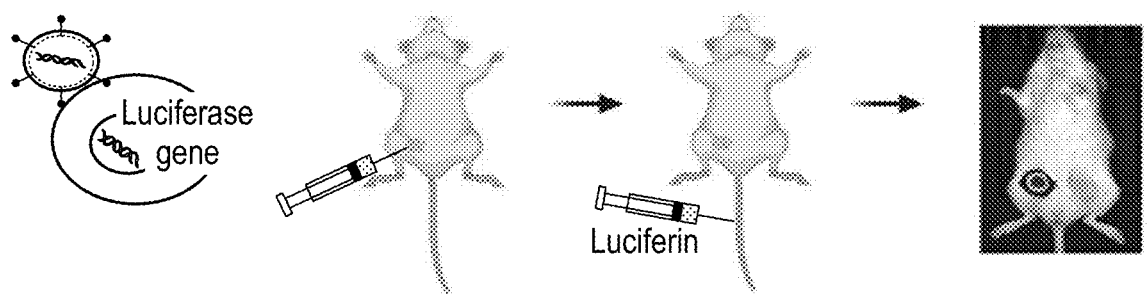
FIGS. 7A-7E show in-vivo imaging results of NENs reporter in mice xenograft model, monitoring the change in tumor growth/biomass of lung NCI-H727 cells. The xenografts were established 5 days following the subcutaneous injection of $4 \times 10^6$ NCI-H727-Luciferase cells to athymic nude mice.
Figure 7B:
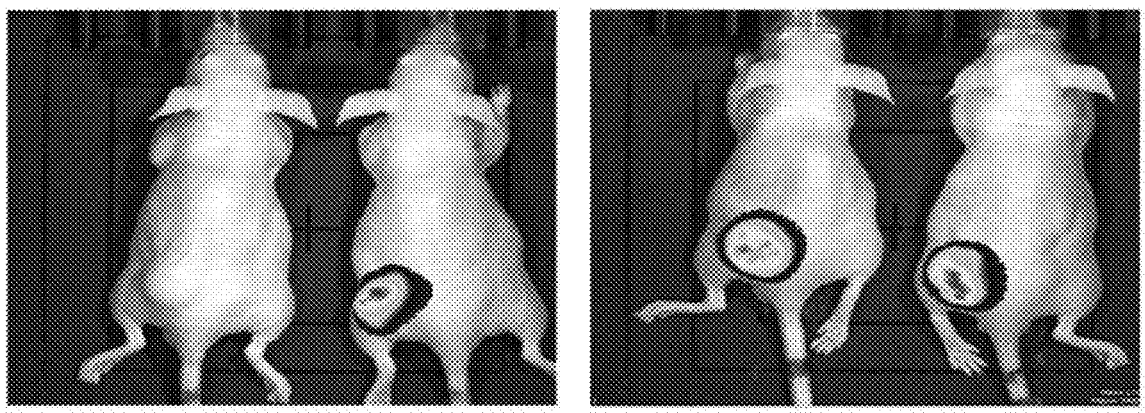
Figure 7C:
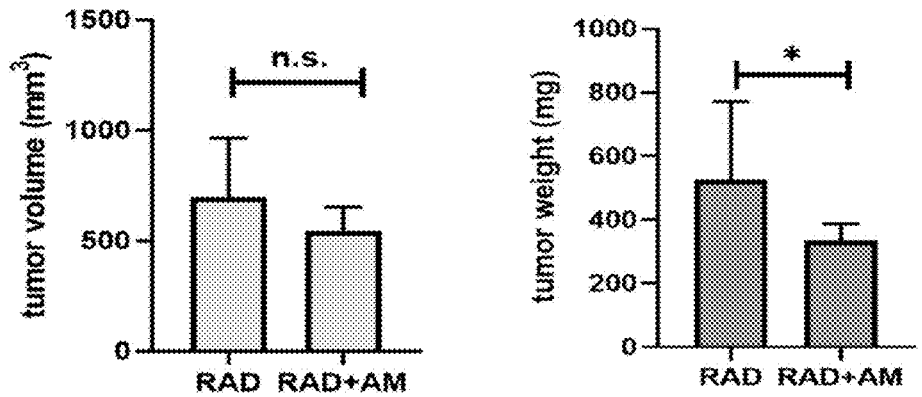
Figure 7D:
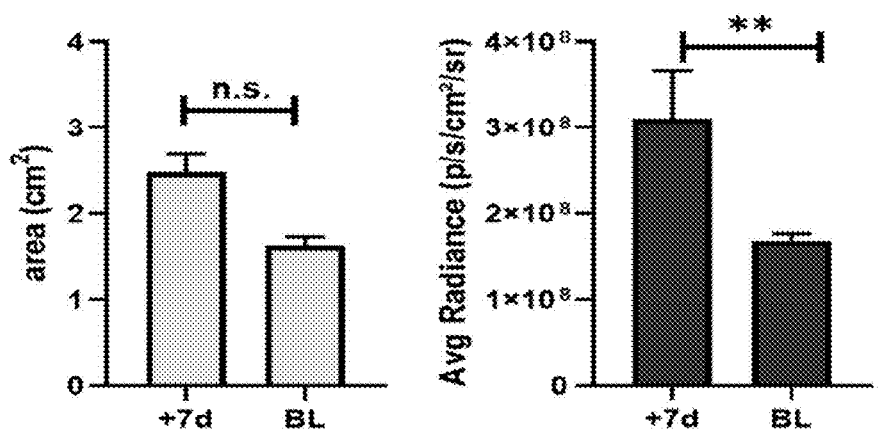

Reference is now made to Example 7, FIGS. 7C-7D.

Advantageously and surprisingly, neoplasm treated with mTOR inhibitor alone or a combination of ECR antagonist and mTOR inhibitor, are associated with a unique gene expression signature comprising a set of 8 differentially expressed genes shared between the two groups of treatment; according to some exemplified embodiments thereof, the set of 8 differentially expressed genes includes: [FABP1, EIF3C, MT-ATP8, MUC2, PGGHG, SIK1B, EGR3, and MIR483]; in some embodiments, the set of 8 differentially expressed genes is divided into two each consisting of 4 genes and having opposite pattern of expression; In some additional embodiments, the two groups having opposite pattern of expression includes the following genes: [FABP1, EIF3C, MT-ATP8, and MUC2] and [PGGHG, SIK1B, EGR3, and MIR483]. In yet some more embodiments, the opposite pattern of expression includes 4 genes that are upregulated [PGGHG, SIK1B, EGR3, and MIR483] and 4 genes that are downregulated [FABP1, EIF3C, MT-ATP8, and MUC2] in samples treated with ECR antagonist and mTOR inhibitor with respect to the control; in yet some more embodiments, the opposite pattern of expression includes 4 genes that are upregulated [FABP1, EIF3C, MT-ATP8, and MUC2] and 4 genes that are downregulated [PGGHG, SIK1B, EGR3, and MIR483] in samples treated with mTOR inhibitor alone with respect to the control. Each possibility is a separate embodiment.

In some exemplified embodiments, combining treatment with ECR antagonist and mTOR inhibitor produces a specific gene signature that involves metabolic pathways; in some embodiments the metabolic pathways comprise Type 1 diabetes and/or negative regulation of carbohydrate metabolism; in some embodiments the metabolic pathways comprise regulation of glycolysis.

In some embodiments, each of the two groups of differentially expressed genes having opposite patterns of expression is associated with different opposite states of neoplasm/tumor including: either a state of drug resistance and/or growth progression/biomass increase, or a state of: reduced/prevented drug resistance and/or inhibition/reduction of growth progression/inhibition of the increase in biomass; in some embodiments, a state of reduced/prevented drug resistance and/or inhibition/reduction of growth progression/inhibition of the increase in biomass of a neoplasm/tumor is associated with upregulation of [PGGHG, SIK1B, EGR3, and MIR483] and downregulation of [FABP1, EIF3C, MT-ATP8, and MUC2]; in some embodiments, drug resistance and/or growth progression/biomass increase of a neoplasm/tumor is associated with upregulation of [FABP1, EIF3C, MT-ATP8, and MUC2] and downregulation of [PGGHG, SIK1B, EGR3, and MIR483]. Each possibility is a separate embodiment.

In some other exemplified embodiments, the 8 differentially expressed genes [FABP1, EIF3C, MT-ATP8, MUC2, PGGHG, SIK1B, EGR3, and MIR483] are associated with biological functions/processes/pathways related to: Type 1 diabetes and/or negative regulation of carbohydrate metabolism; in some embodiments, the 8 differentially expressed genes [FABP1, EIF3C, MT-ATP8, MUC2, PGGHG, SIK1B, EGR3, and MIR483] are associated with biological functions/processes/pathways related to: regulation of glycolysis inside tumor cells. Each possibility is a separate embodiment.

In some exemplified embodiments provided herein, treatment with ECR antagonist and/or mTOR inhibitor comprises a comparison with control or with neoplasm/cells treated with each agent alone; in some exemplified embodiments control comprises untreated cells or cells treated with PBS, DMSO or similar; in some embodiments, neoplasm comprises NENs. Each possibility is a separate embodiment.

In some embodiment, differential expression of one or more genes comprises a change of at least (−/+) 0.1-fold, (−/+) 0.25-fold, (−/+) 0.5-fold, (−/+) 0.75-fold, (−/+) 1.25-fold, (−/+) 1.5-fold, (−/+) 1.75-fold, (−/+) 2-fold, (−/+) 3-fold, (−/+) 4-fold, or more, relative to control or to the expression before the administration of ECR antagonist and the mTOR inhibitor. Each possibility is a separate embodiment.

In some exemplified embodiment, a change in the differential expression is at least (−/+) 0.5-fold relative to control or to the expression before the administration of ECR antagonist and the mTOR inhibitor; in some exemplified embodiment, a change in the differential expression is at least (−/+) 0.25-fold relative to control or to the expression before the administration of ECR antagonist and the mTOR inhibitor Each possibility is a separate embodiment.

Figure 8A:
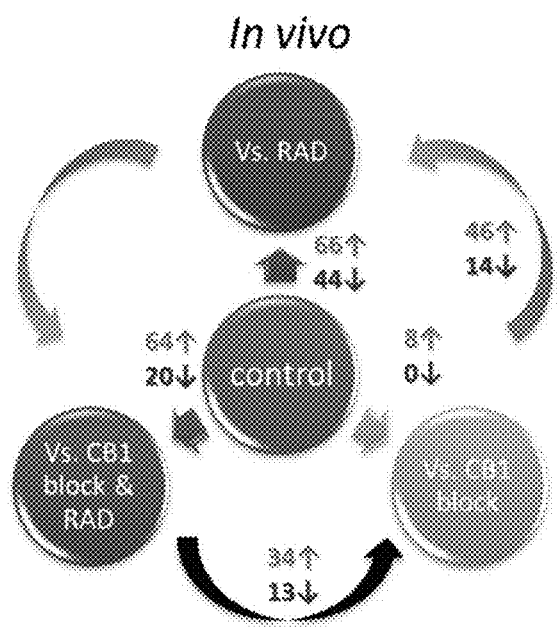
FIGS. 8A-8C present results of RNA sequencing analysis performed on a similar experimental setup described in FIGS. 5A-5D and FIGS. 6A-5B.
Figure 8B:
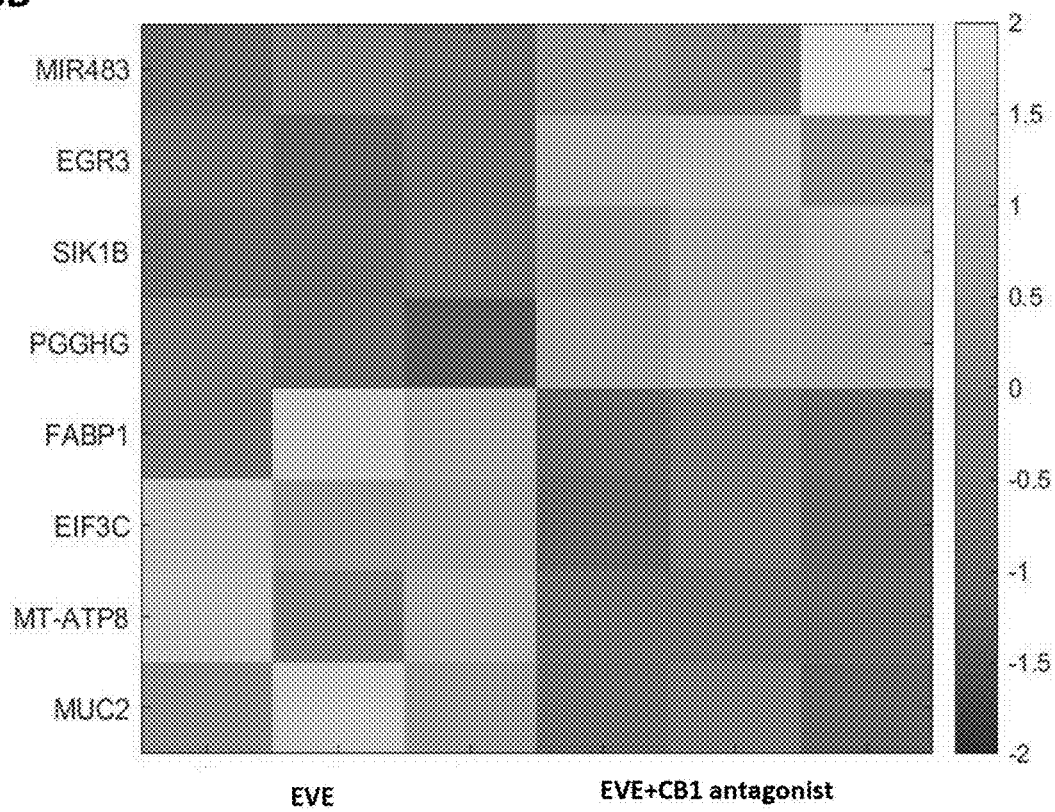
Figure 8C:
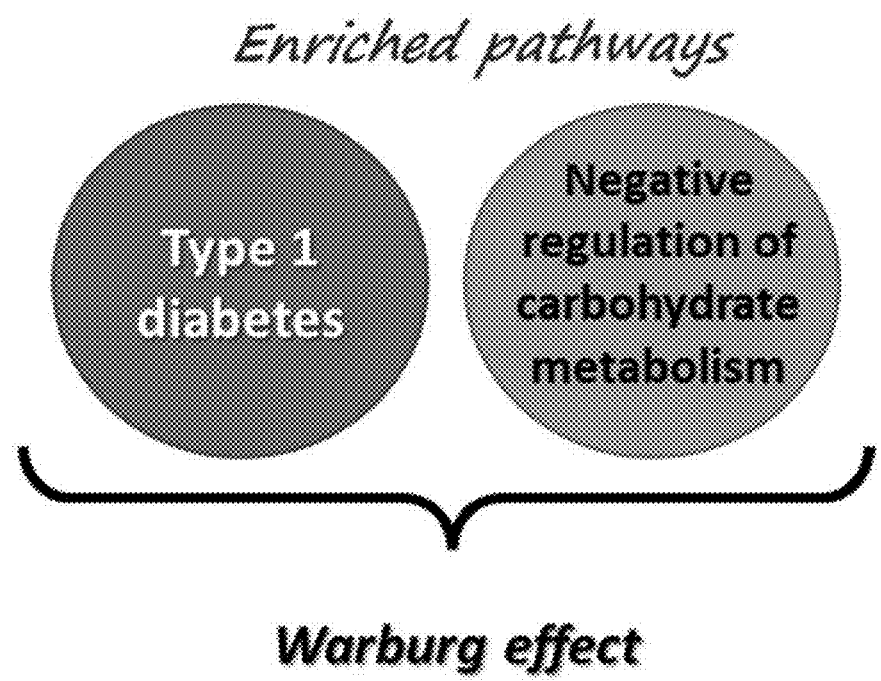

Reference is now made to Example 8, FIGS. 8A-8C and Table 1.

According to some exemplified embodiments, treatment with ECR antagonist induces the herein disclosed and exemplified effects on neoplasm/tumor at low nanomolar concentrations; in some embodiments low nanomolar concentrations comprises less than 35 nM, less than 30 nM, less than 25 nM, less than 20 nM, less than 10 nM, less than 5 nM, less than 4 nM, less than 3 nM, less than 2 nM, or less than 1 nM; in some embodiments the ECR antagonist comprises rimonabant, TM38837, JD-5034, or any combination thereof Reference is now made to Example 9, FIGS. 9A-9D.

The following examples are presented in order to more fully illustrate some embodiments of the invention. They should in no way be construed, however, as limiting the broad scope of the invention. One skilled in the art can readily devise many variations and modifications of the principles disclosed herein without departing from the scope of the invention.

EXAMPLES

Materials and Methods

Cell Culture: NCI-H727 (human lung typical carcinoid cell line, ATCC CRL-5815), maintained in RPMI1640 supplemented with 10% fetal bovine serum, 1% penicillin/streptomycin, and L-glutamine. NT3 cells are maintained in RPMI1640 Glutamax, supplemented with 10% fetal bovine serum, 1% penicillin/streptomycin, EGF, and FGF2. BON1 cells are maintained in DMEM/F12 media supplemented with 10% fetal bovine serum, 1% penicillin/streptomycin, and L-glutamine. All cells held in 5% CO2 at 37° C.

Reagents: Everolimus (RAD001) and sunitinib malate were purchased from LC laboratories (Woburn, MA, USA) and dissolved in DMSO. AM251 and BML-190 (CB1 and CB2 antagonists) were purchased from Abcam, dissolved in DMSO to a final concentration of 50 mM.

WST-1 viability assay/XTT cell proliferation assay: Cell viability was tested using the XTT (Biological Industries, Beit Haemek, Israel) or WST-1 (Abcam, Cambridge, UK) at 24, 48, and 72 hours of treatment. All assays will be performed in 6 replicates and repeated at least 3 times.

Flow cytometry: NCI-H727, BON1, and NT3 cells were seeded in 12-wells tissue culture plates at a density of 5×105 cells/well and incubated for 24 h. Next, cells were stained for the expression of CB1 and CB2 receptors and analyzed using a Fortessa flow cytometer (Becton Dickinson Bioscience, NJ, USA). Results were processed with FCS Express 4 Software (De Novo Software, Glendale, CA, USA). For apoptosis evaluation cells were stained with-APC tagged Annexin V and Propidium Iodide (PI) according to the manufacturer's instructions (BioLegend, San Diego, CA, USA).

CFSE cells labeling: NCI-H727 and BON1 cells were stained with CFSE for 30 min followed by several PBS washes and seeded in 12-wells tissue culture plates at a density of 5×105 cells/well for 24 h. The following day cells were treated with the study drugs for the next 48 hours: (i) Untreated cells (control) (ii) Everolimus, (iii) AM251, (iv) AM251 and Everolimus. Cells were analyzed using a Fortessa flow cytometer (Becton Dickinson Bioscience, NJ, USA). Results processed with FCS Express 4 Software (De Novo Software, Glendale, CA, USA).

Immunofluorescence staining: NENs paraffin-embedded samples underwent deparaffinization, dehydration, and antigens retrieval. Following CAS blocking (Life Technologies, Carlsbad, CA, USA), samples were stained with anti-CB1 and anti-CB2 antibodies (all purchased from Abcam, Cambridge, UK). After overnight incubation at 4° C., slides were washed and incubated with 2nd antibody donkey anti-rabbit Alexa fluor 555 (purchased from Abcam, Cambridge, UK) for 2 hrs. Counterstaining will be done with DAPI (KPL, Gaithersburg, MD, USA) and covered with mounting solution (Immco Diagnostics Inc, Buffalo, NY, USA). Slides imaged will be captured with a confocal microscope ZEISS LSM 710 (Carl Zeiss, Oberkochen, Germany). Image quantification will be done using Image J software. At least 10 different tumor samples were stained from each kind (lung, small intestine, pancreas).

Subcutaneous Xenograft Tumor Model-Experimental design: Male athymic nude mice (4-6 weeks; ~25 g) were purchased from Envigo (Jerusalem Israel) and housed in an animal care facility at Hadassah campus. NCI-H727 subcutaneous xenografts were established 7 days after 4×106 NCI-727 cells injection (in 200 μL of sterile PBS 1:1) subcutaneously in the upper flank. Once the average tumor size will reach 130 mm3, mice were randomized into six groups (n=12 per group) and treated with the study drugs for the next 4 weeks: (i) vehicle (PBS), (ii) Everolimus, (iii) AM251, (iv) AM251 and Everolimus. Tumor size was measured every other day using calipers and the volume was calculated. At the completion of the experiment, mice were sacrificed and tumors excised, weighed and taken for histopathologic assessment and RNA-seq evaluation.

IVIS scans: A fluorescent reporter in NCI-727 cells was established using the services of VectorBuilder Inc. (Chicago IL USA). The above mice model was used for an in vivo tumor-genesis with mild changes; mice were randomized into five groups: mono-drug therapy (i) everolimus (ii) sunitinib and (iii) AM251, dual-drug therapy: (iv) everolimus with AM251 (CB1 antagonist) (v) sunitinib with AM251 (CB1 antagonist). Mice were monitored weekly (and scanned three times a week) using IVIS live imaging system (Waltham MA USA) for tumor size and shape until tumor mortality or its eradication. Luciferin injections will be administered 10 min before each scanning.

RNA-Seq: samples of fresh human tumor tissues from typical and atypical LNENs patients were collected at the Neuroendocrine Tumor Unit, ENETS Center of Excellence at Hadassah Medical Center under approved institutional ethics committee protocols after the patient signed the consent form. Gene expression was measured by full transcript paired-end RNA-seq. Tumor samples were snap-frozen, homogenized, and purified using a miRNeasy kit. RNA concentrations were measured using a Qbit fluorimeter and followed by TapeStation for RNA stability. Samples were then proceed for library generation using Illumina TruSeq RNA-Seq Sample Prep kit. The RNA-seq libraries were subsequently sequenced on Illumina HiSEq 2500, and standard bioinformatics were utilized. Samples sequencing, quality control, and initial bioinformatic analyses was performed by "The Genomic Applications Laboratory, The Core Research facility of the Hebrew University. This experiment was designed to determine differentially expressed genes using the R package DESeq and to perform pathway analyses with Ingenuity Pathway Analysis (Ingenuity Systems).

Data analysis: To assess the significance of differences between groups, the Chi-Square test was used for categorical results and the 2-tailed Mann-Whitney test for quantitative results. The latter was used based on previous experience, suggesting that the results are best analyzed using a non-parametric test. P less than 0.05 was considered significant.

Example 1: Expression of Endocannabinoid Receptors (ECR) in Neuroendocrine Neoplasms (NEN) Cells Lines and Biopsies First, Neuroendocrine Neoplasms (NEN) cell lines NCI-H727, BON1, and NT3 were cell sorted based on expression of the endocannabinoid receptors CB1 and CB2. Flow cytometry results suggest that cells of all three cell lines exclusively express CB1, but not CB2 (FIG. 1A).

Figure 1B:
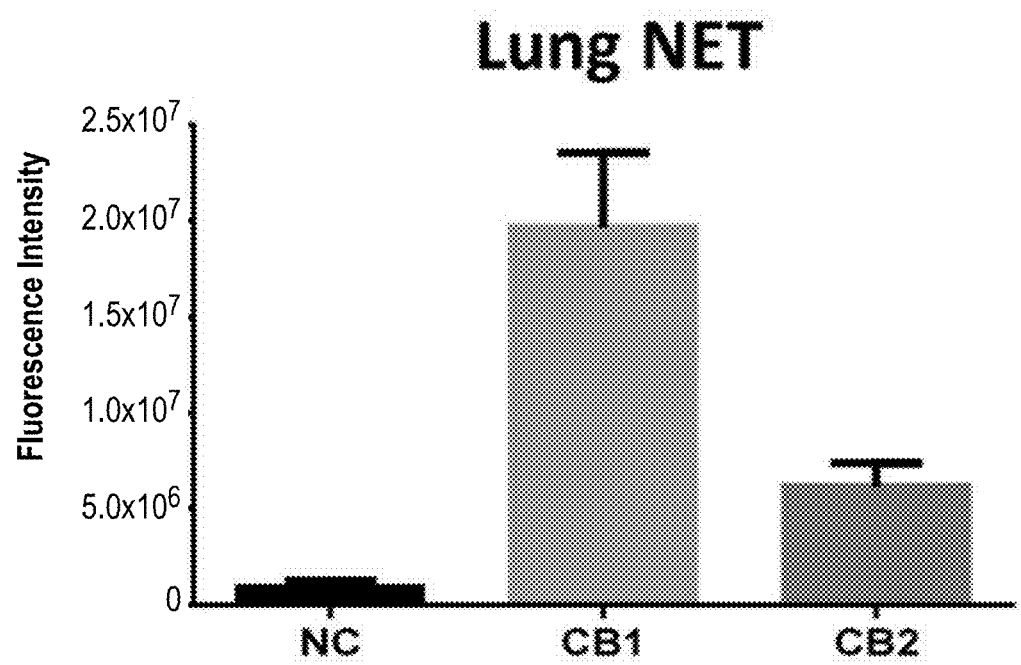
Figure 1B:
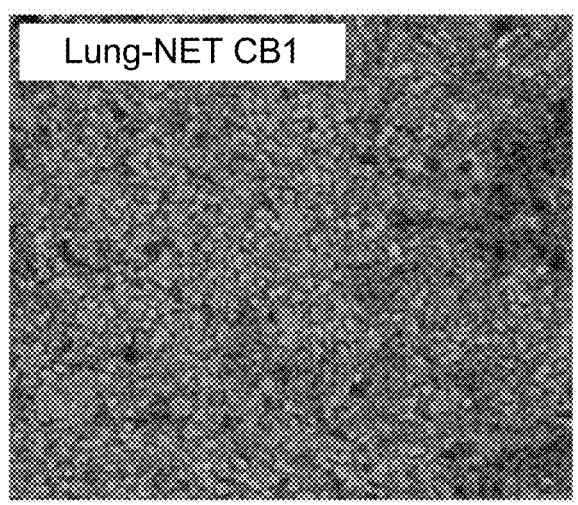
Figure 1B:
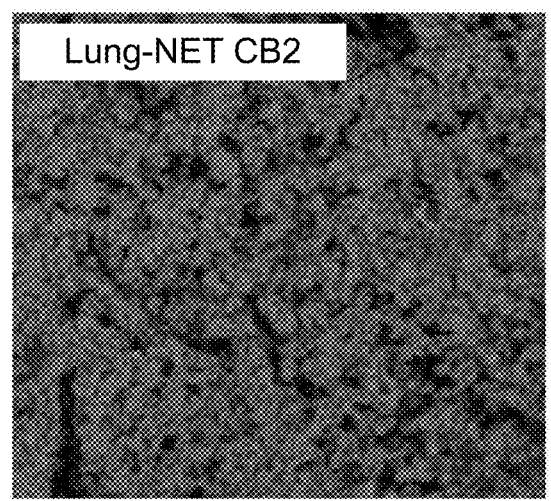
Figure 1C:
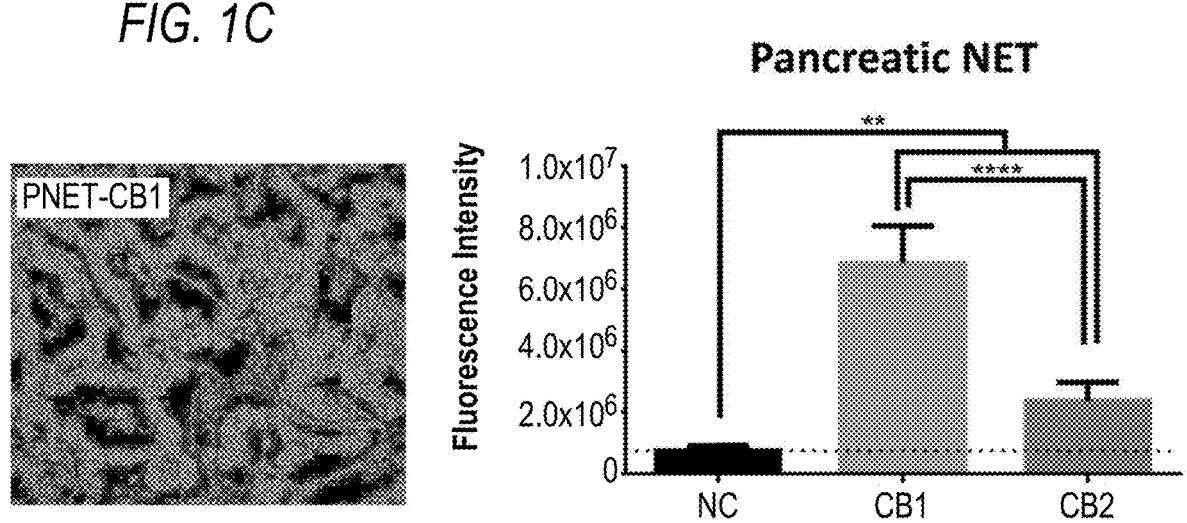
Figure 1D:
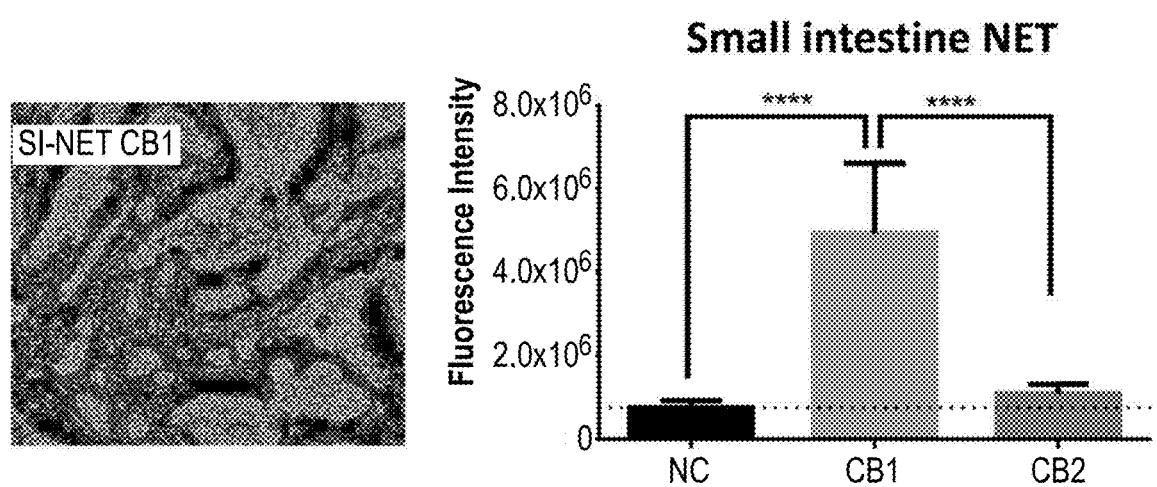

Similar results were obtained from biopsies of NEN tumors from humans, including lung net (FIG. 1B), pancreatic NET (PNET BON1) (FIG. 1C), and small intestine NET (SI-NET) (FIG. 1D that were 36mmune-stained for the expression of endocannabinoid receptors CB1 and CB2, or for a negative control using fluorescence labeled antibodies. Taken together the results shown in FIGS. 1A-1D demonstrate that CB1 is the receptor which is mostly expressed in primary NENs tumor samples.

Figure 1E:
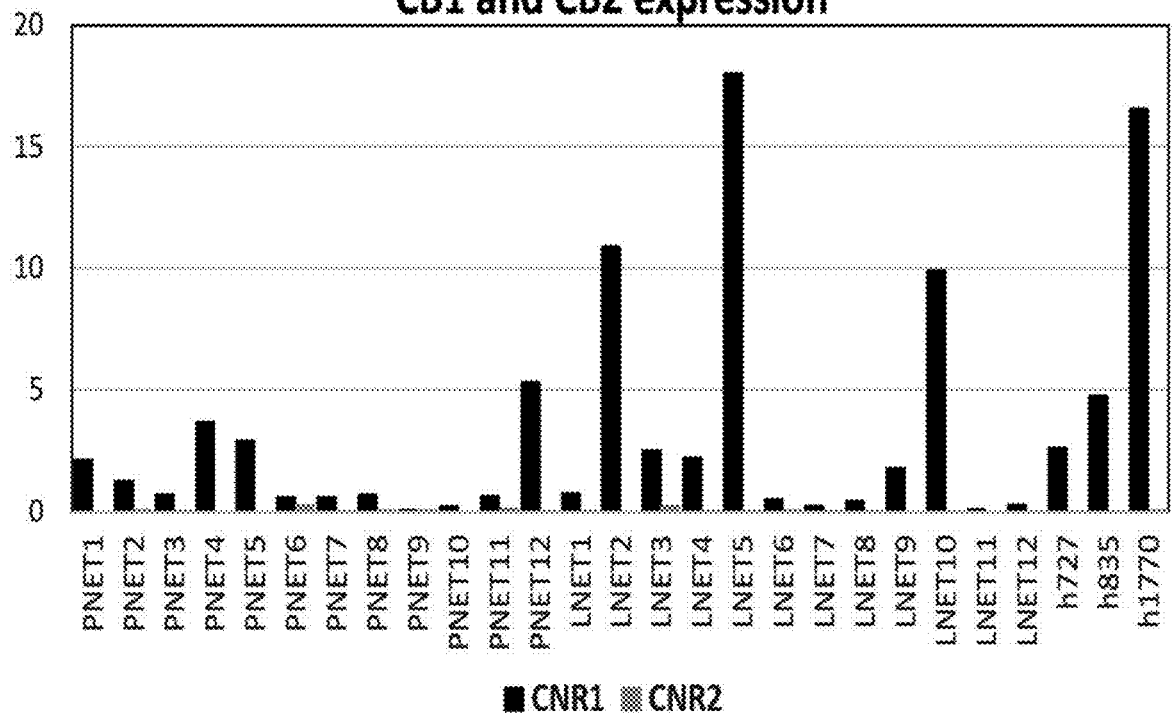

Next, expression of the endocannabinoid receptors was measured in fresh biopsies using RNAseq. The results of the sequencing further support the finding that CB1 (CNR1) but not CB2 (CNR2) is the receptor which is exclusively expressed in NEN (FIG. 1E).

Figure 1F:
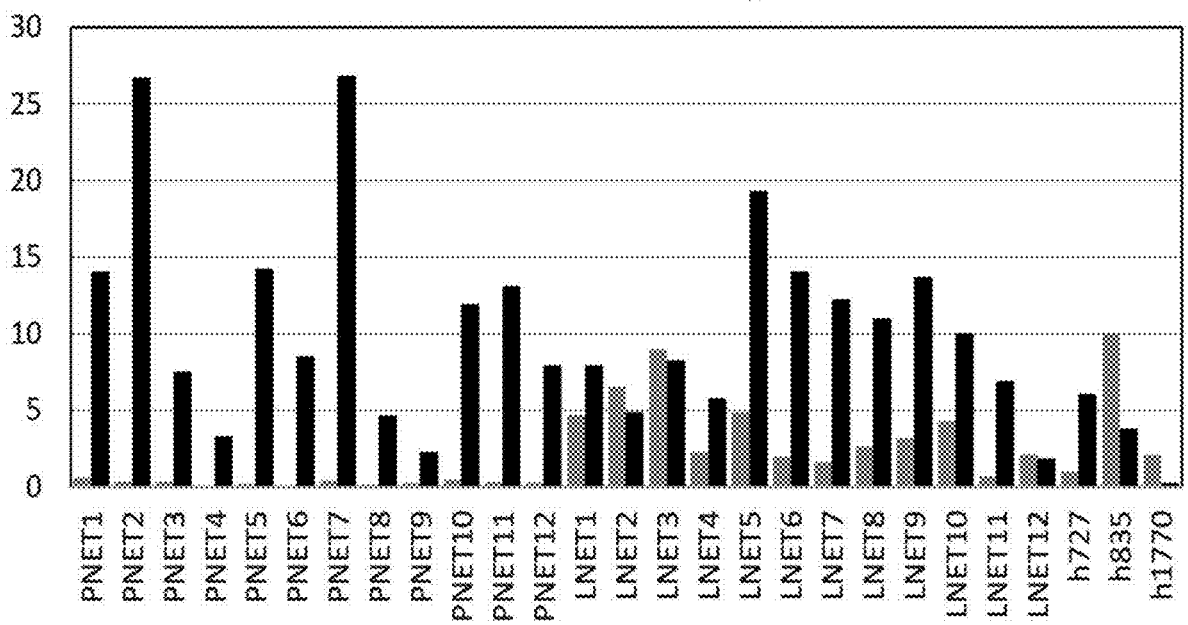
Figure 1G:
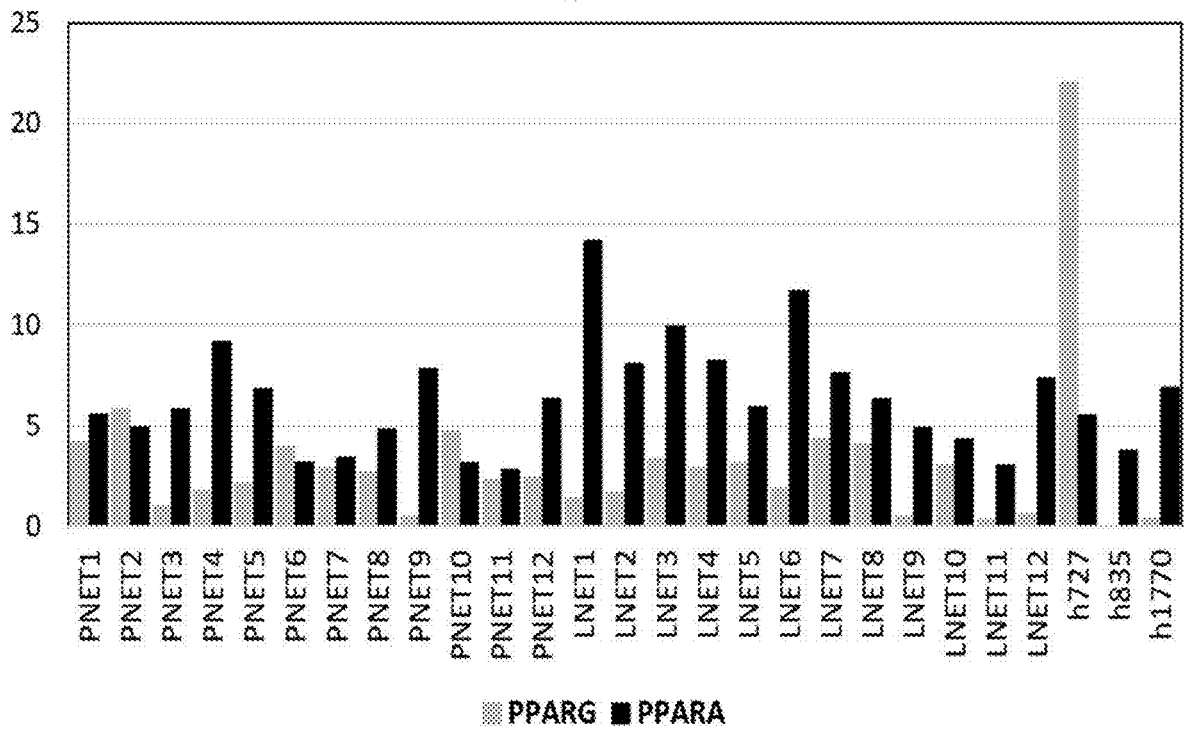
Figure 1H:
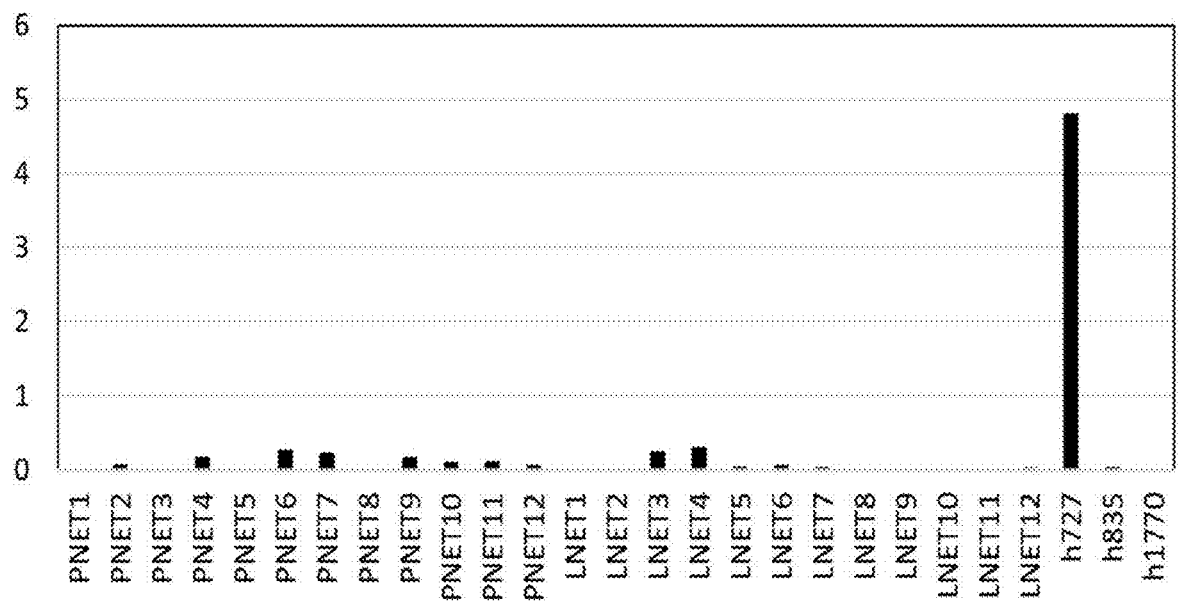

The expression of other endocannabinoid receptors was also determined using RNAseq. The results show that expression of TRPV2 but not of TRPV1 (FIG. 1F), and of PPARα but not of PPARγ (FIG. 1G), were found to be high across all samples. GPR55 expression was mostly expressed in the NENs cell line h727 (FIG. 1H)

Example 2: The Effect of Cannabis Extracts, Everolimus, and ECR Blocking Using CB1 and/or CB2 Antagonists on NENs Cell Viability Viability of NEN cell lines PNET BON1 (Right) and NCI-H727 (Left) was assessed using WST-1 calorimetric assay following their exposure to various cannabis extracts or Everolimus (RAD001) (FIG. 2B). While most screened cannabis extracts did not affect NEN cell viability (FIG. 2A; Gray solid lines), few of them significantly affected cell viability, and the most effective extracts, reduced cell viability by approximately 30 to 50% after 24 h to 72 h (FIG. 2A; Gray broken lines). Everolimus alone, at 20 nM and 50 nM, did not affect NEN cell viability (FIG. 2B).

Next, viability of untreated NENs cells (marked as 'cells') was compared to same cells treated with different agents (FIGS. 2C-2D). Here, one of the beneficial cannabis extract, previously identified in the screen, was used to reduce cellular viability of PNET BON1 (Right) and lung NCI-H727 (Left), either when applied to stimulate the cells alone (marked as 82), or following inhibition with CB1 or CB2 or both (82+CB1 inh or 82+CB2 inh or 82+CB1-2 inh). Cells were also stimulated by applying CB1 or CB2 antagonists alone (CB1 inh or CB2 inh).

The results show that blocking CB1, but not CB2, before applying the cannabis extract (82) rescues the cannabis induced cell death (FIG. 2C). In addition, when cells where not exposed to any cannabis extracts, blocking of CB1 only using CB1 antagonist also led to cell death manifested as 30% to 40% reduction in cellular viability, while blocking of CB2 only using CB2 antagonist did not reduce the viability of the cells (FIG. 2C and summarized in FIG. 2D).

The results suggests that beneficial cannabis extracts act via CB1 to reduce NENs cells viability, and that the baseline activation of CB1 is involved in promoting NENs cells viability.

The results also demonstrate that inhibiting CB1 using CB1 antagonist promotes reduction in cell viability/induction of cell death of NENs, by preventing the baseline activation of CB1 which promotes their viability (FIG. 2D).

Furthermore, the combined effect of the mTOR inhibitor Everolimus with or without two types of beneficial cannabis extracts (marked as CE82 and CE32), or with CB1 antagonist/inhibitor on the viability of NCI-H727 cells was also evaluated.

Figure 2E:
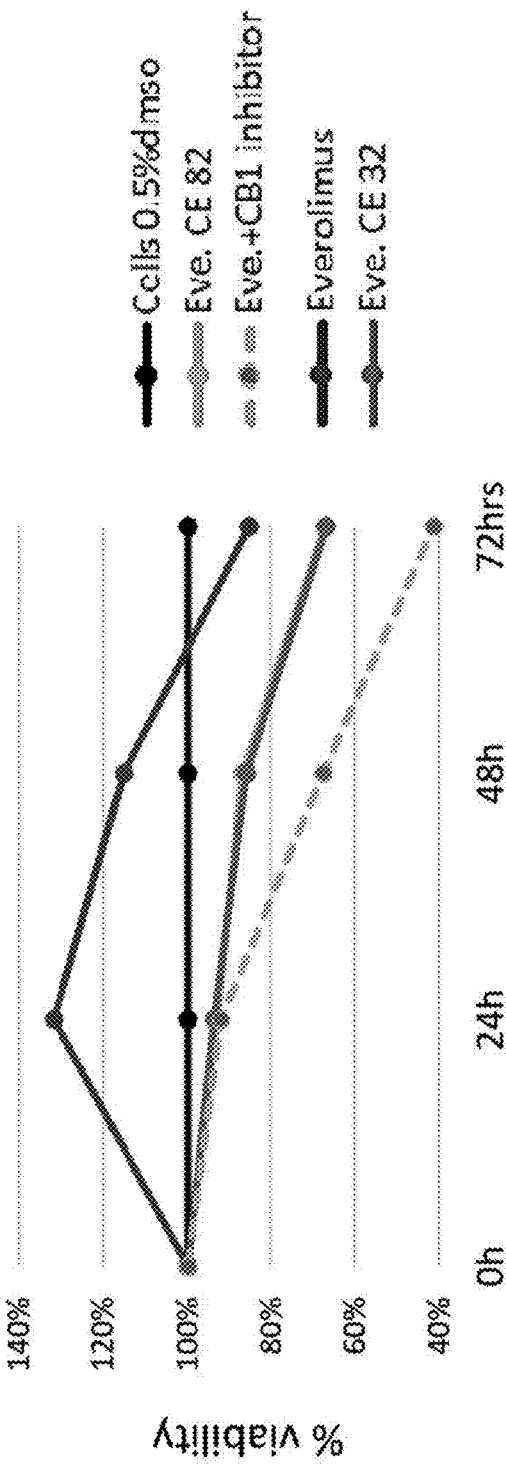

The results show that addition of cannabis extract to Everolimus increased the inhibitory effect on cells viability. (FIG. 2E)

Advantageously, this effect was even more pronounced when Everolimus was combined with CB1 blocking, augmenting a strong reduction of 50%-60% in cell viability within 48 h-72 h, compared to Everolimus or control cells treated with dmso alone. (FIG. 2E).

Example 3: CB1 Inhibition Increases Apoptosis and Reduces the Level of Necrosis in NENs Cells To evaluate if the reduction in cell viability includes induction of cell death, the effect of CB1 inhibition on apoptosis of PNET BON-1 and lung NCI-H727 cells was tested using FACS analysis (FIG. 3A). Quantification of the results show that blocking CB1 using CB1antagonist increases NENs apoptosis by more than 2-fold at concentrations of 10 uM and 30 uM, relative to untreated cells, while also reducing the percentage of necrotic cells by 2-fold relative to untreated cells (FIG. 3B and FIG. 3C).

Figure 4A:
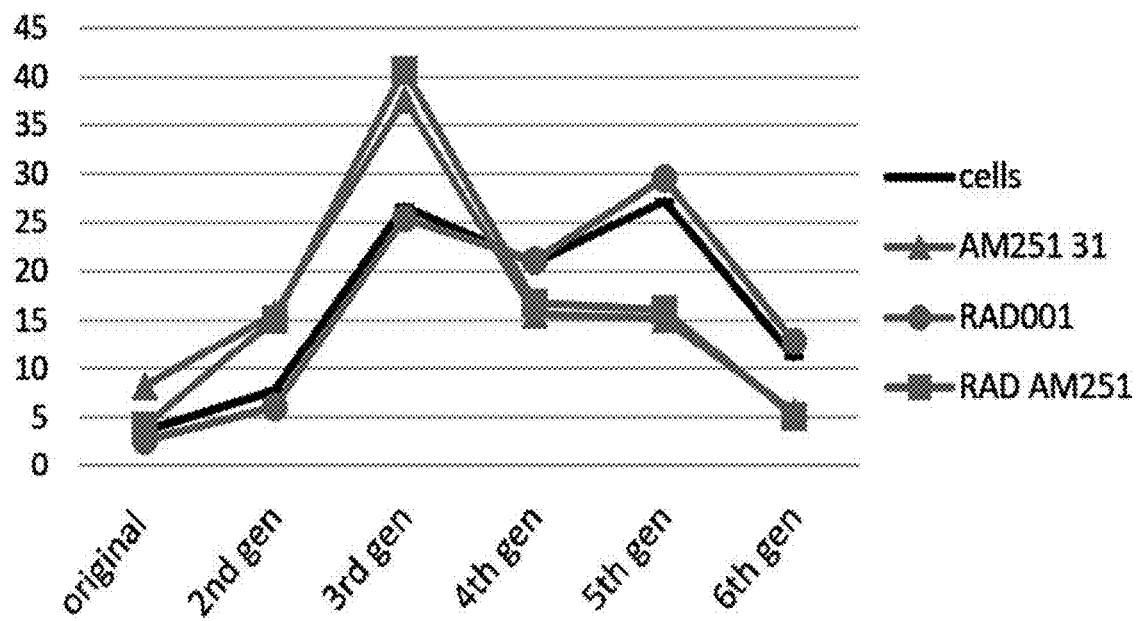
FIGS. 4A-4E present cell cycle analyses of NEN cells after staining with CFSE-cell division marker and flow cytometry. Cells were treated with CB1 antagonist (AM251), Everolimus (RAD001), or both (RAD+AM251).

Example 4: CB1 Inhibition with and without mTOR Inhibition Induces Cell Cycle Arrest and Reduces the Rate of Proliferation of NENs Cells Next, the impact of ECR inhibition and/or mTOR inhibition using CB1 inhibition (AM251) and/or Everolimus (RAD001) or both (AM251+RAD001) on cell proliferation was determined in PNET BON-1 and NCI-H727 NENs (FIGS. 4A-4B).

Figure 4B:
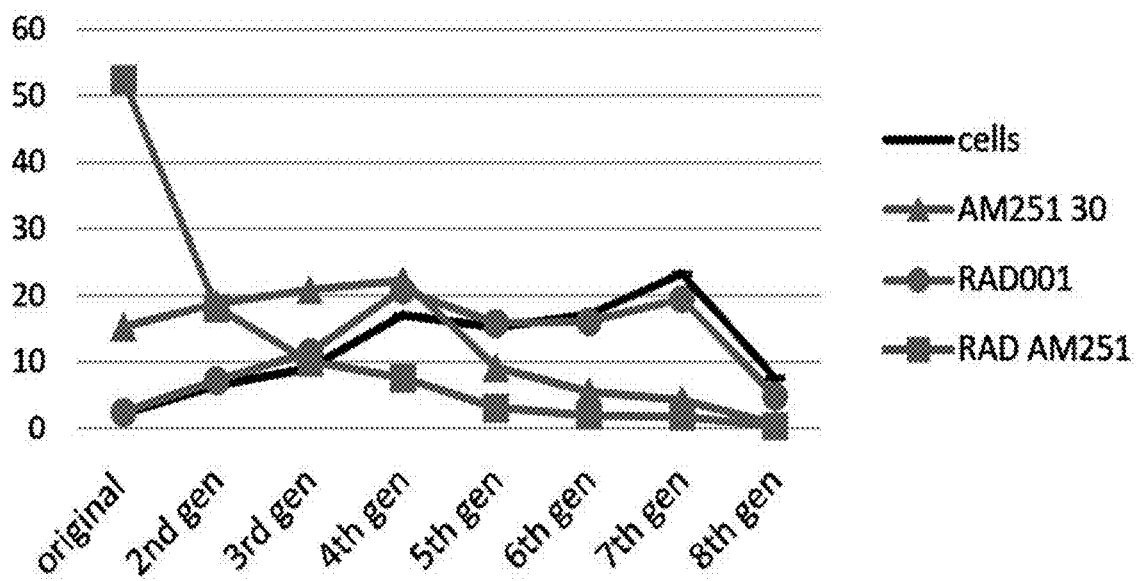

Surprisingly, the results show that while blocking CB1 alone causes cell arrest (FIG. 4A), blocking it in combination with Everolimus (AM251+RAD001) caused an even more prominent inhibitory effect on the ability of the cells to proliferate after the $2^{nd}$ or $3^{rd}$ generation by promoting cell arrest (FIG. 4B)

Figure 4C:
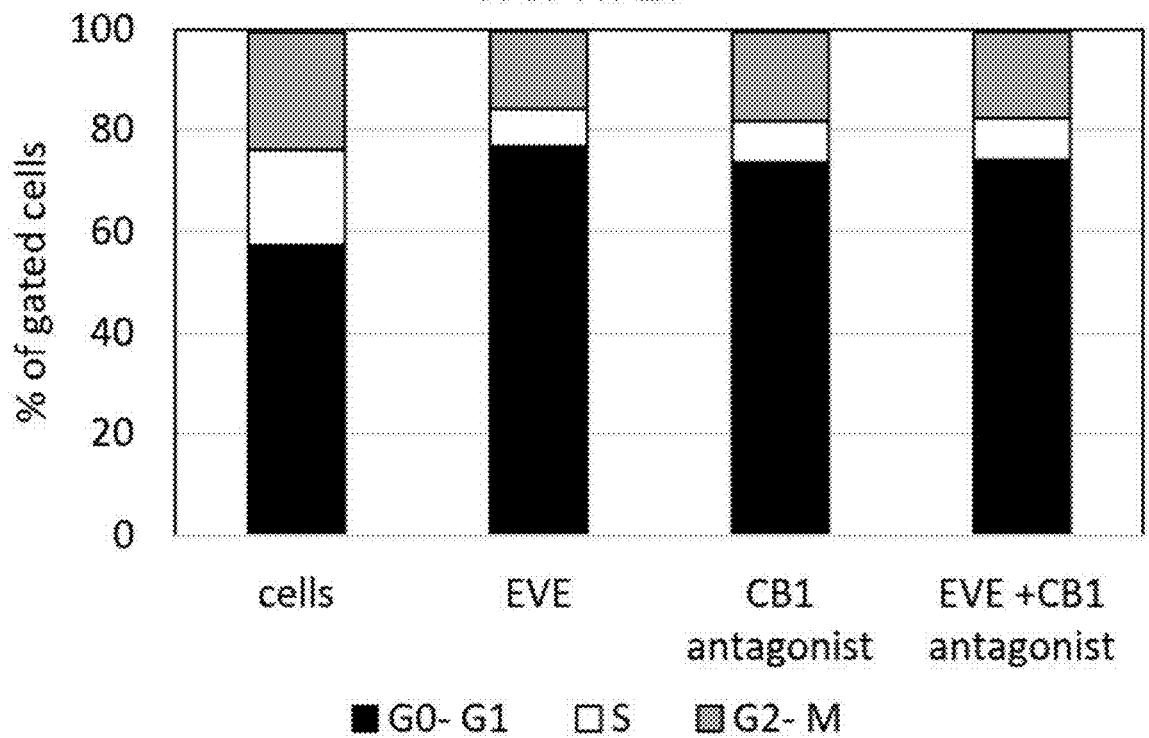
Figure 4D:
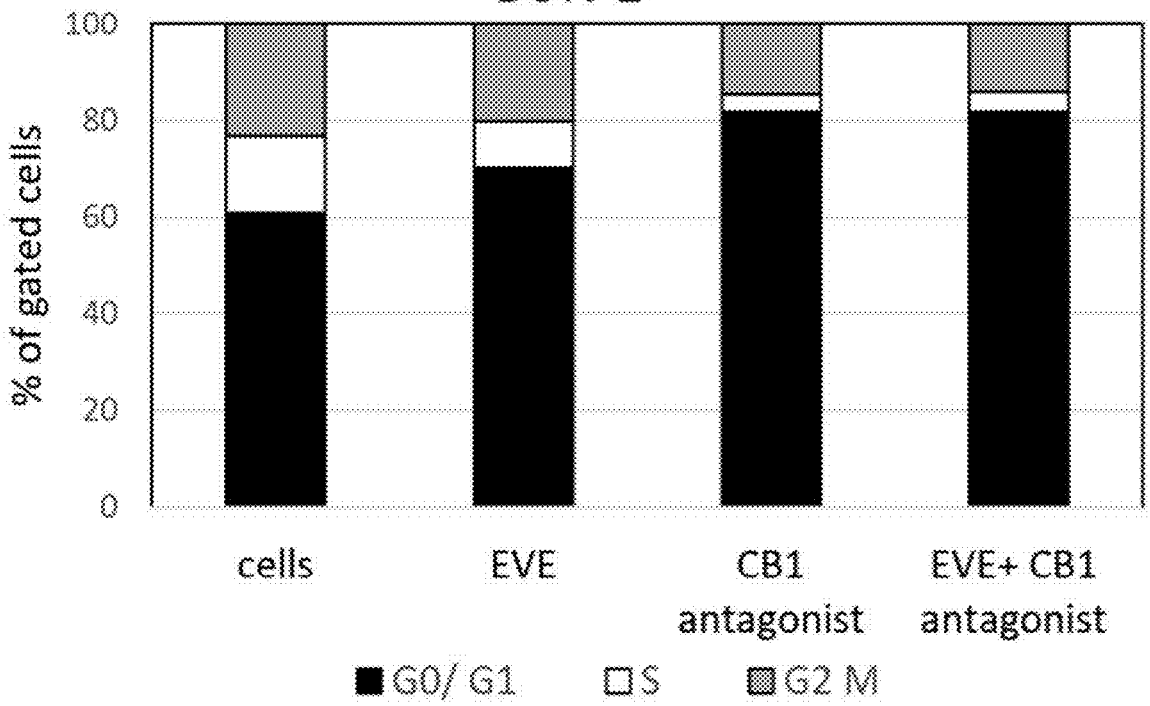
Figure 4E:
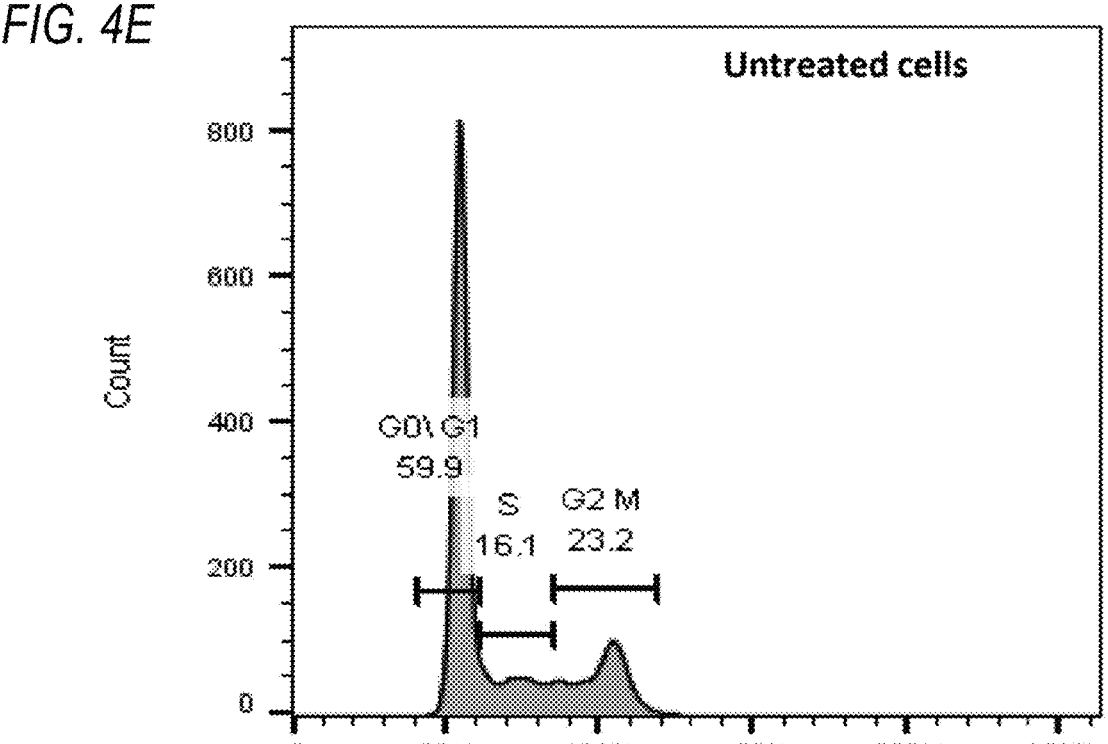
Figure 4E:
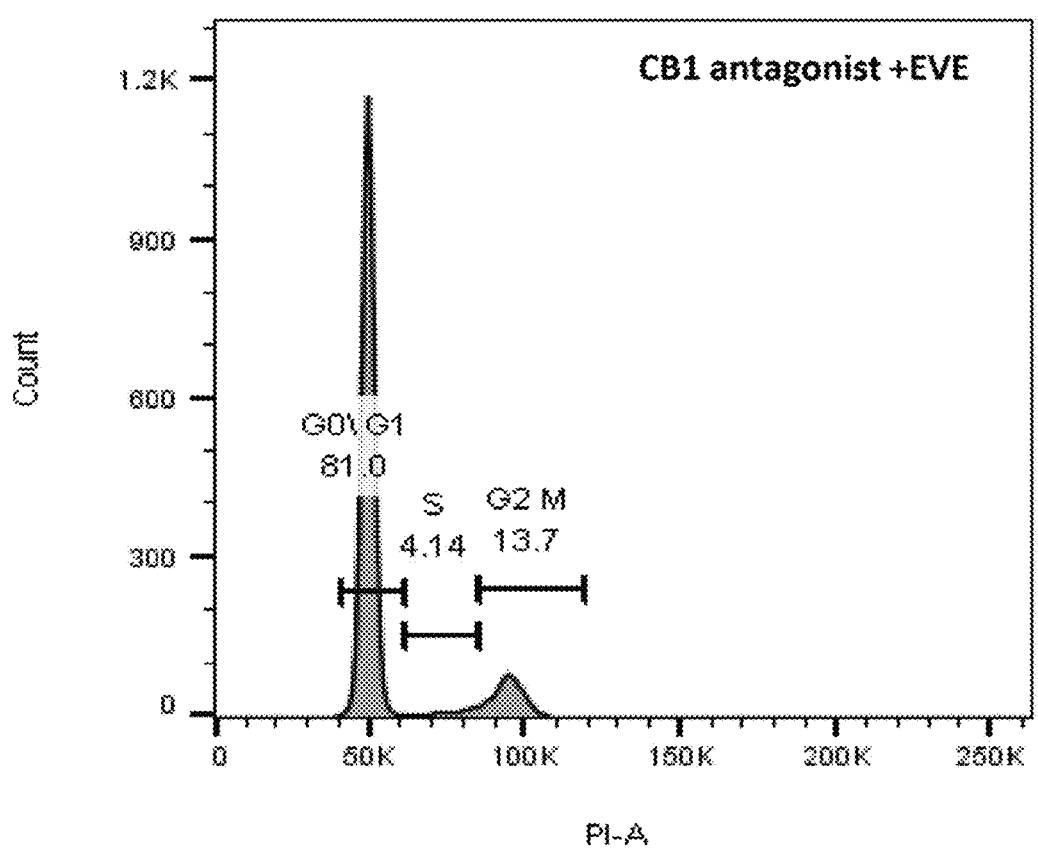

To test how the treatment affects the cell cycle across the population of NENs cells, FACS analysis was performed (FIGS. 4C-4E).

The results are indicative of a transition from S phase and G2 M phase to G0/G1 phase in NCI-H727 cells (FIG. 4C), PNET BON-1 cells (FIG. 4D) treated with CB1 antagonist alone or combined with Everolimus.

Thus, advantageously, CB1 blocking alone or combined with Everolimus, promoted a shift in the cell cycle state towards cell arrest at G0/G1 phase, thereby reducing the rate of proliferation of NEN cells (FIG. 4E).

Example 5: In-Vivo Attenuation of Tumor Growth in Mice NENs Xenograft Model

To test the effect of ECR inhibition and/or mTOR inhibition exerts on NENs tumor growth in-vivo, a mouse NEN Xenograft model was established and several groups of mice were treated with Everolimus (RAD001), CB1 blocker (AM251), both Everolimus and CB1 blocker (RAD001+AM251), or PBS control, during 30 days before being sacrificed (FIGS. 5A-5D).

Figure 5A:
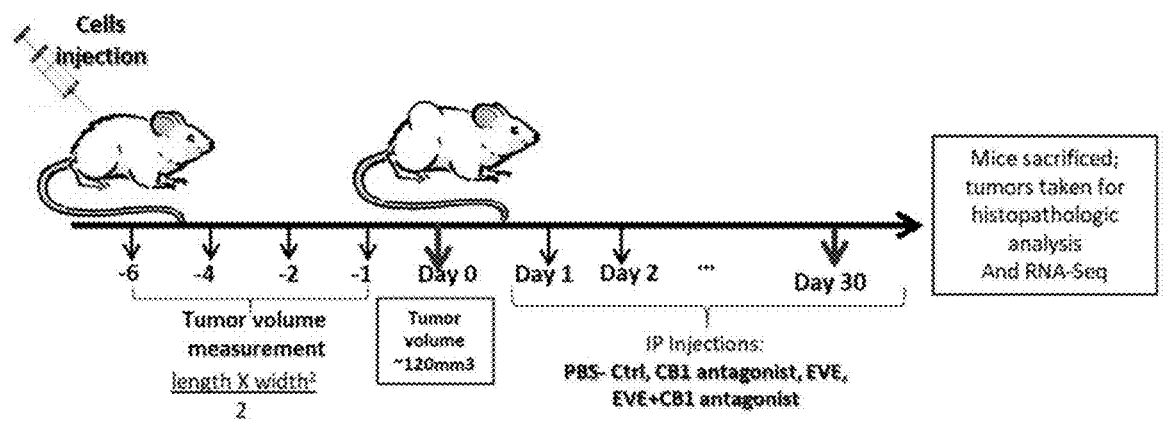
FIGS. 5A-5D present in-vivo experiments with mice NEN Xenograft model, established to monitor the change in tumor dimensions/growth of lung NCI-H727 cells. $4 \times 10^6$ tumor xenograft cells were subcutaneously injected to SCID mice. Once the neoplasm size reached 130 mm$^3$, mice were randomized into 4 groups and treated for the next 4 weeks with IP injections of: Everolimus (EVE/RAD001), CB1 antagonist/blocker (AM251) or both (RAD001+AM251), versus control mice treated with PBS. The change in tumor size was monitored for 29 days.
Figure 5B:
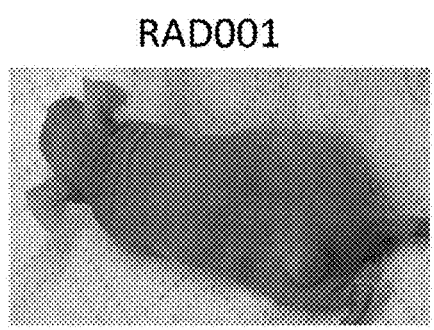
Figure 5B:
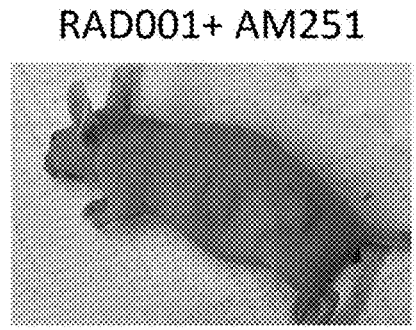
Figure 5C:
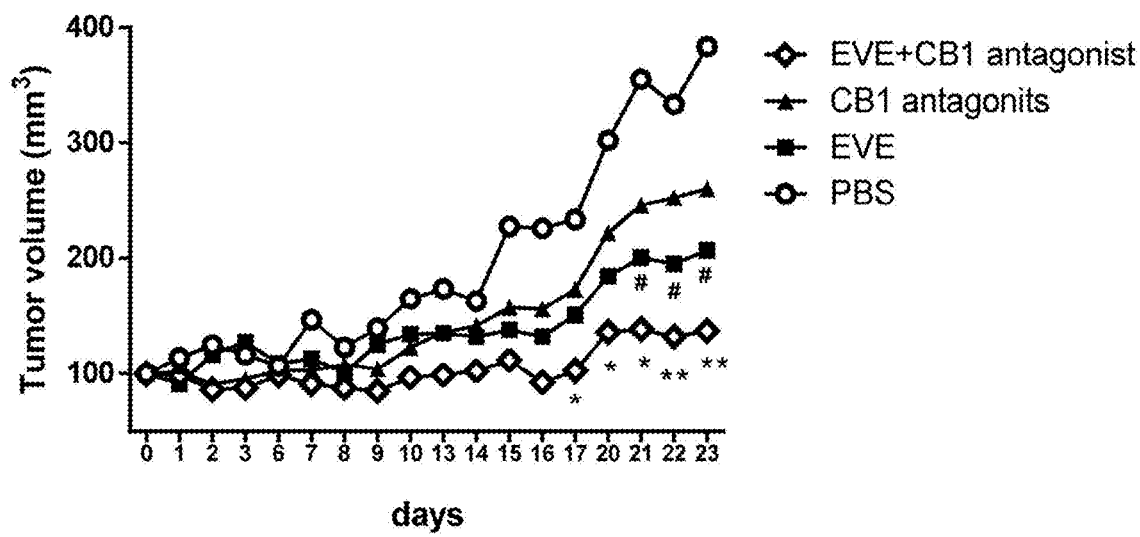
Figure 5D:
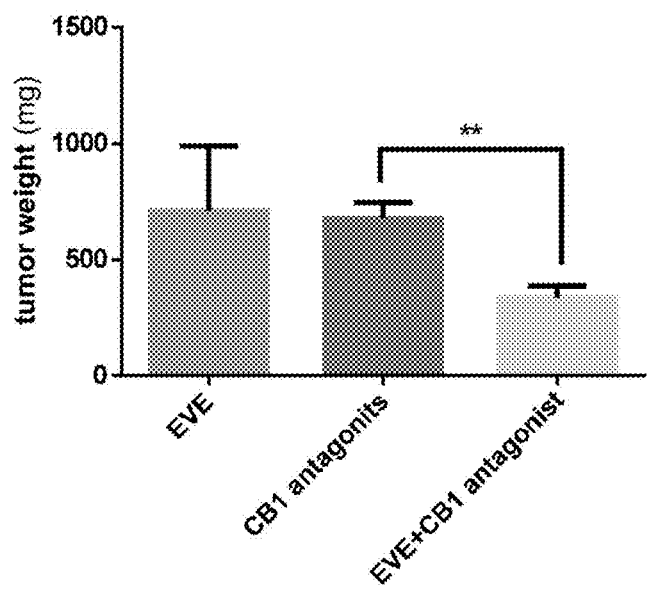

Results indicate that the in-vivo effect corroborate the effect of the in-vitro experiments performed to evaluate viability, cell death and proliferation, and show an augmented reduction in tumor volume and weight of mice treated with Everolimus in combination with CB1 blocker, compared with mono-therapy with either agent alone (FIG. 5C-5D).

The combined therapy strongly attenuated the increase in NENs tumor size.

For example, at day 23 tumor volume of RAD001+AM251 treated mice was less than 150% while the tumor volume of control mice treated with PBS reached 400%, and that of mice treated with AM251 or RAD001 alone was 250% and 200%, respectively (FIG. 5C). In parallel, tumor weight of RAD001+AM251 treated mice was reduced by 2-fold compared with each treatment alone (FIG. 5D).

Advantageously and surprisingly, combined treatment with mTOR inhibitor and CB1 antagonist exerts a stronger, possibly additive, or at least additive (i.e., synergistic) inhibitory effect on in-vivo tumor growth, volume and/or weight, compared with each treatment alone.

Example 6: Resistance of NEN Tumor Cells In-Vivo in Mice NEN Xenograft Model

Next, a resistance analysis of NENs tumor cells to treatment with Everolimus (RAD001), CB1 blocker (AM251), Everolimus and CB1 blocker (RAD001+AM251), or PBS control, was performed in-vivo in the same setup described hereinabove (in previous Example 5, FIGS. 5A-5D).

Resistance of tumor cells was evaluated based on the response to the treatment over time (FIGS. 6A-6B). Results show that at the beginning of the treatment, all treated groups including Everolimus, CB1 blocker, and both Everolimus and CB1 blocker showed a positive effect with reduced tumor biomass compared to control PBS (FIG. 6A, 2$^{nd}$ week, days 6-10), while at later stage only the combined treatment (Everolimus and CB1 blocking) retained its potent effect which show a steady non-growing tumor biomass, while the mono-therapy with each agent alone did not show such effect and showed a constant increase in tumor biomass in similar levels to the control PBS (FIG. 6B, 4$^{th}$ week, days 20-23), advantageously highlighting that the combined treatment showed less resistant development over time.

Example 7: In-Vivo Inhibition of Tumor Biomass in Mice NENs Reporter Xenograft Model NENs reporter xenograft model was established to monitor the change in tumor biomass/growth of NEN cells, for example, lung NCI-H727 cells in-vivo using an in-vivo imaging system (IVIS) (FIGS. 7A-7E), thereby complementing the in-vivo measurements previously performed using standard measurement methods, as presented in Examples 5-6).

As can be seen in FIGS. 7C-7D, measurements of tumors biomass/weight are indicative of a 1.5-fold decrease in tumor volume and 2-fold decrease in tumor weight, of mice treated with Everolium combined with CB1 antagonist (RAD001+AM251) compared with mice treated with Everolium alone when measured by standard method (FIG. 7C).

Similar values of 1.5-fold and 2-fold were obtained for tumor area and tumor radiance, respectively, when measured by IVIS (FIG. 7D).

Figure 7E:
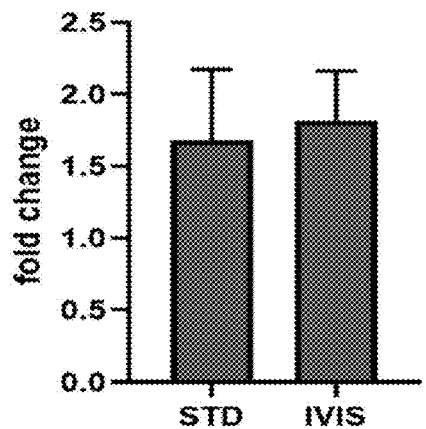

These results are also indicative of the ability to achieve accurate tumor biomass/size quantification and expansion pattern using IVIS, as the fold-change values of 1.5-fold to 2-fold were obtained using the standard methods are in agreement with the IVIS measurements (FIG. 7E).

Advantageously, treatment with CB1 antagonist together with Everolium yielded stronger effect on tumor biomass in-vivo, than CB1 antagonist alone.

Example 8: RNAseq Analyses of Differentially Expressed Genes Characterizing the Response of NEN Tumor Cells to Treatments Using CB1 Antagonists and mTOR Inhibitors In-Vivo To dissect the underlying mechanism for the positive response of neoplasm/tumor to the combined treatment with ECR antagonists and mTOR inhibitors, and to further characterize the prevention/reduction in drug resistance exhibited by neoplasm/tumor treated with ECR antagonists and mTOR inhibitors relative to treatment with mTOR inhibitor alone-as disclosed hereinabove in previous examples-the genes and pathways involved in the in-vivo response of NENs tumor xenograft cells to the combined treatment of CB1 antagonists and mTOR inhibitors were evaluated by performing RNA sequencing analyses of differentially expressed genes.

Tumor samples were taken from mice treated according to the schematic illustration of FIG. 5A that presents the generation and experimental setup of the in-vivo NENs xenograft model using lung NCI-H727. Accordingly, at day 30, mice were sacrificed, and tumor samples were subjected to RNAseq and to computational analysis of differentially expressed genes.

As can be seen from FIGS. 8A-8C, combining CB1 blocking with Everolimus (EVE) advantageously produces a specific gene signature that involves metabolic pathways.

The results of the RNAseq analysis are schematically illustrated in FIG. 8A showing large sets of genes which are upregulated and downregulated between the different groups of treatment, including control, CB1 antagonists, mTOR inhibitors, and the combination of CB1 antagonist and mTOR inhibitor.

For example, FIG. 8A shows that analysis of the genes differentially expressed in-vivo, between the group of treatment that include mTOR inhibitor (RAD001) to the control group, revels that 66 genes were upregulated, and 44 genes were downregulate, and that between the group of treatment that include combination of mTOR inhibitor with CB1 antagonist (RAD001+AM251) to the control group 64 genes were upregulated, and 20 genes were downregulate. The statistical cutoff was 0.01.

In addition, advantageously and surprisingly, a comparative analysis performed between those two groups of treatment that include mTOR inhibitor (RAD001) and combination of mTOR inhibitor with CB1 antagonist (RAD001+AM251), revealed a unique signature comprising a group of 8 differentially expressed genes shared between the two groups of treatment (Table 1 and FIG. 8B).

FIG. 8B shows a heatmap of the unique pattern of expression that is shared between this set of 8 differently expressed genes, and characterizes the response of in-vivo NENs tumor cells to treatment with mTOR inhibitors alone (associated with drug resistance and progression in tumor growth) or to combined treatment of CB1 antagonists and mTOR inhibit (associated with reduction in drug resistance and tumor biomass growth inhibition).

The unique pattern of expression includes 4 genes that are downregulated [FABP1, EIF3C, MT-ATP8, and MUC2] and 4 genes that are upregulated [PGGHG, SIK1B, EGR3, and MIR483] in samples treated with the combination of mTOR inhibitor with CB1 antagonist (RAD0001+AM251) with respect to the control, and a unique opposite pattern of expression in samples treated with mTOR inhibitor alone (RAD001) (i.e., 4 genes that are downregulated [PGGHG, SIK1B, EGR3, and MIR4834] and 4 genes that are upregulated [FABP1, EIF3C, MT-ATP8, and MUC2]).

Table 1 hereinbelow summarizes the gene description and the known function of those 8 genes characterizing response of NENs tumor cells In-vivo to treatment with mTOR inhibitors alone or to combined treatment of CB1 antagonists and mTOR inhibit, while upregulation and downregulation refers to the differential expression pattern of the combined treatment with CB1 antagonist and mTOR inhibitor.

TABLE 1

Differentially expressed genes sharing unique opposite pattern of expression.

|  | gene name | know function |
|---|---|---|
| *upregulated | MIR483 | Intronic miRNA regulate its own expression of insulin-like growth factor 2 expression |
|  | EGR3 | transcriptional regulation of genes in controlling biological rhythm |

TABLE 1-continued

Differentially expressed genes sharing unique opposite pattern of expression.

| | gene name | know function |
|---|---|---|
| *downregulated | SIK1B | cellular response to glucose starvation |
| | PGGHG | enzyme involved in glycosylphosphatidylinositol-anchor biosynthesis |
| | FABP1 | involved in intracellular lipid transport. |
| | EIF3C | involved in cell proliferation, including cell cycling, differentiation and apoptosis |
| | MT-ATP8 | Involved in mitochondrial ATP synthesis coupled proton transport |
| | MUC2 | mucin protein secreted from goblet cells in the epithelial lining into the lumen of the large intestine |

*Upregulation and downregulation refer to combined treatment with CB1 antagonist and mTOR inhibitor Further gene ontology (GO)/pathway enrichment analysis for the set of the 8 genes revealed enrichment of their activity in certain biological processes, including Type 1 diabetes and negative regulation of carbohydrate metabolism. This result is illustrated in FIG. 8C, and may be indicative of the involvement of this set of 8 genes in regulation of aerobic glycolysis inside tumor cells as part of Warburg effect.

Example 9: New CB1 Antagonists

Additional CB1 inhibitors Rimonbanat, JD and TM were tested for their effect on NEN cells at nanomolar concentrations between 10 nM to 35 nM.

Figure 9A:
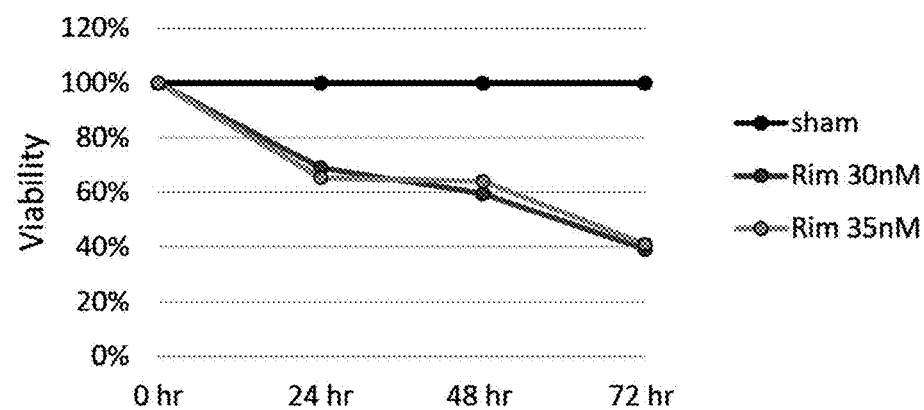
FIGS. 9A-9D show graphs presenting the effect of CB1 antagonists Rimonbanat (FIG. 9A), JD-5034 (JD) (FIG. 9B), TM38837 (TM) (FIG. 9C), and comparison between the three CB1 antagonists (FIG. 9D) on the survival of NENs cell (% of viable cells vs. different inhibitor conc. over time measured using WST-1 calorimetric assay). Sham is control of Naïve cells. Rimonbanat, JD and TM at 10 nM, 15 nM, 20 nM, 30 nM and 35 nM on lung NCI-H727 cells.
Figure 9B:
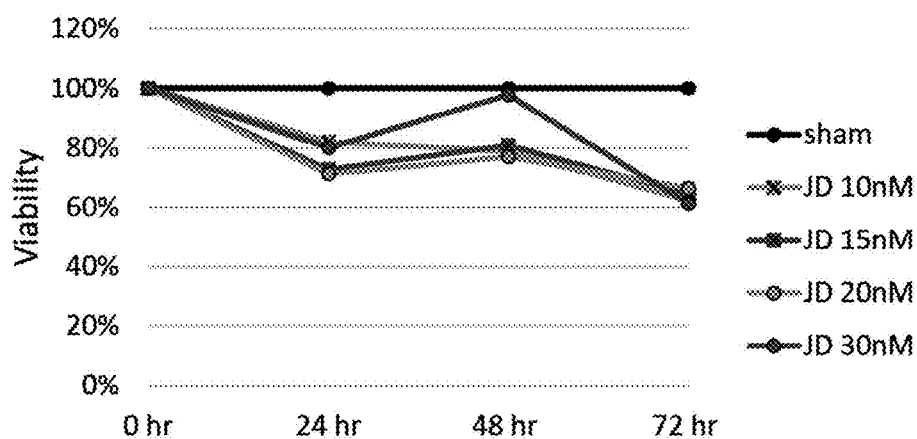
Figure 9C:
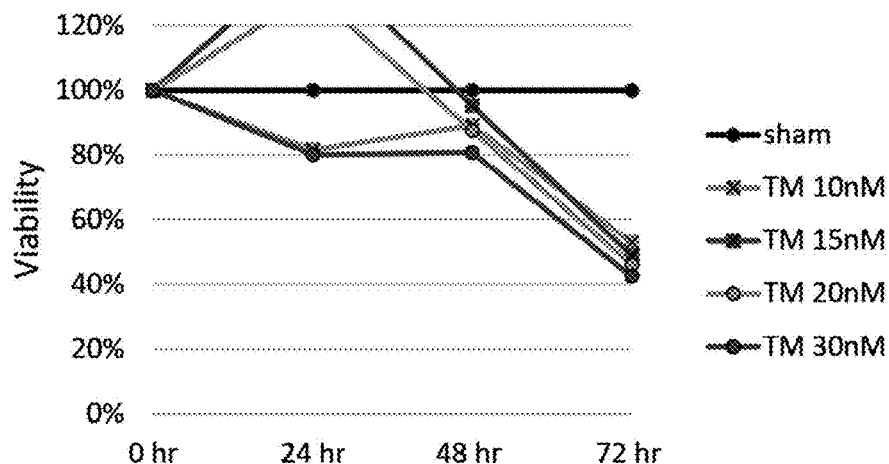

As shown in FIGS. 9A-9C Rimonbanat, JD and TM were capable of reducing the survival of NEN cell (viable cells) by 40%-60% relative to untreated cells (indicated as sham).

Figure 9D:
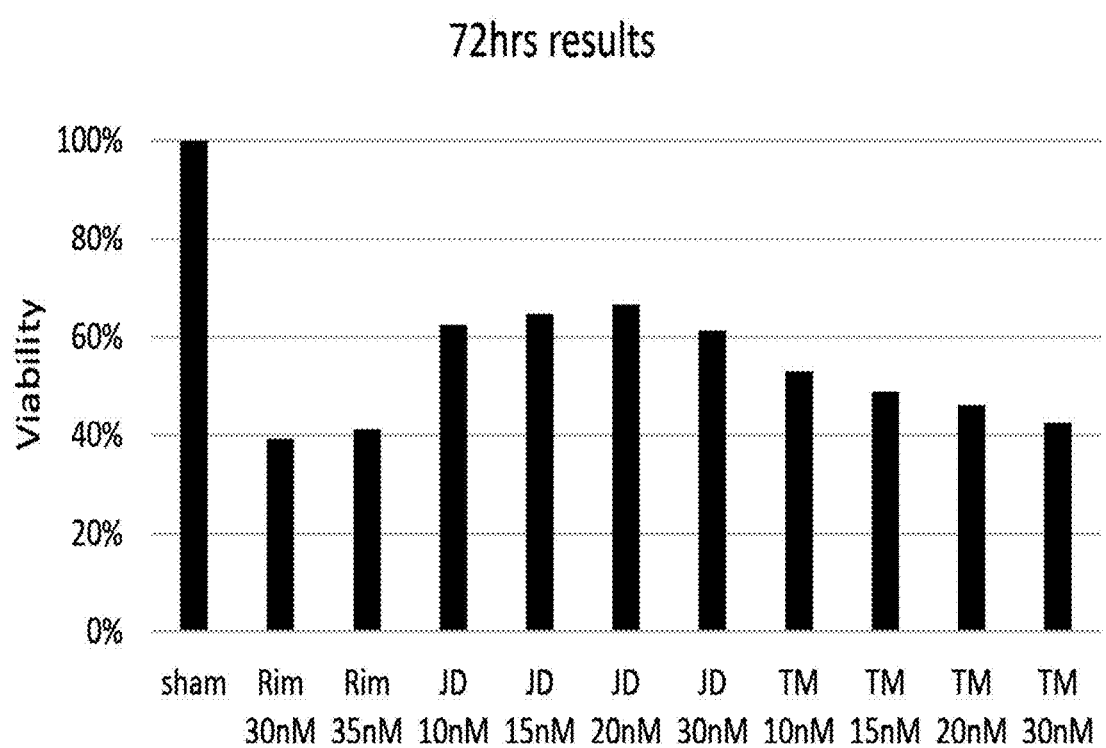

Advantageously, all three CB1 antagonists exhibited near 50% or above 50% inhibition at clinically relevant concentrations FIG. 9D.

While certain embodiments of the invention have been illustrated and described, it will be clear that the invention is not limited to the embodiments described herein. Numerous modifications, changes, variations, substitutions and equivalents will be apparent to those skilled in the art without departing from the spirit and scope of the present invention as described by the claims, which follow.

The invention claimed is:

1. A method for treating neoplasm comprising administering to a subject in need thereof an endocannabinoid receptor (ECR) antagonist and an mTOR inhibitor, wherein the neoplasm is a Neuroendocrine Neoplasm (NEN).

2. The method of claim 1, wherein the mTOR inhibitor is selected from rapamycin, deforolimus, temsirolimus, everolimus, ridaforolimus, Torin1, BEZ-235, or any combination thereof.

3. The method of claim 1, wherein the ECR antagonist is a CB1 antagonist.

4. The method of claim 3, wherein the CB1 antagonist is selected from AM251, rimonabant, TM38837, JD-5034, SR147778, NESS 0327, LY-320135, AM281, Cannabigerol, Ibipinabant, Otenabant, Tetrahydrocannabivarin, Virodhamine, or any combination thereof.

5. The method of claim 1, wherein the NEN is an unresectable NEN and/or wherein the NEN is a pancreatic NENs or a lung NEN.

6. The method of claim 1, wherein the ECR antagonist and the mTOR inhibitor are administered concomitantly and/or sequentially.

7. The method of claim 1, wherein the neoplasm is a resistant neoplasm.

8. The method of claim 1, wherein the administration of ECR antagonist and mTOR inhibitor reduces or prevents drug resistance to the mTOR inhibitor.

9. The method of claim 1, wherein the neoplasm differentially expresses one or more genes of the group consisting of: FABP1, EIF3C, MT-ATP8, MUC2, PGGHG, SIK1B, EGR3, and MIR483.

10. The method of claim 1, wherein the neoplasm differentially expresses one or more genes of the group consisting of: FABP1, EIF3C, MT-ATP8, and MUC2, and one or more genes of the group consisting of: PGGHG, SIK1B, EGR3, and MIR483; and wherein the two groups comprise opposite patterns of expression of the one or more differentially expressed genes.

11. The method of claim 1, wherein the treatment promotes one or more of:

reduction in neoplasm tumor biomass, reduction in neoplasm cell proliferation, transitioning of neoplasm cells to a state of cell cycle arrest, reduction in neoplasm cell viability, increase in neoplasm cell apoptosis, and reduction in neoplasm cell necrosis.

12. A method for reducing or preventing drug resistance to mTOR inhibitor in a subject suffering from a resistant Neuroendocrine Neoplasm (NEN), the method comprising administering to a subject in need thereof an endocannabinoid receptor (ECR) antagonist and an mTOR inhibitor, and wherein the administration of the ECR antagonist and mTOR inhibitor reduces or prevents drug resistance to mTOR inhibitor.

13. The method of claim 12, wherein the mTOR inhibitor is selected from rapamycin, deforolimus, temsirolimus, everolimus, ridaforolimus, Torin1, BEZ-235, or any combination thereof.

14. The method of claim 12, wherein the ECR antagonist is a CB1 antagonist, and wherein the CB1 antagonist is selected from AM251, rimonabant, TM38837, JD-5034, SR147778, NESS 0327, LY-320135, AM281, Cannabigerol, Ibipinabant, Otenabant, Tetrahydrocannabivarin, Virodhamine, or any combination thereof.

15. The method of claim 12, wherein the resistant neoplasm differentially expresses one or more genes of the group consisting of: FABP1, EIF3C, MT-ATP8, and MUC2, and one or more genes of the group consisting of: PGGHG, SIK1B, EGR3, and MIR483; and wherein the two groups comprise opposite patterns of expression of the one or more differentially expressed genes; and wherein differential expression of the one or more genes comprises a change of at least (−/+) 0.5-fold relative to control or to the expression before the administration of ECR antagonist and the mTOR inhibitor.

\* \* \* \* \*